(12) United States Patent
Aoyama

(10) Patent No.: US 7,447,838 B2
(45) Date of Patent: Nov. 4, 2008

(54) PROGRAM, METHOD AND APPARATUS FOR VIRTUAL STORAGE MANAGEMENT THAT ASSIGNS PHYSICAL VOLUMES MANAGED IN A POOL TO VIRTUAL VOLUMES

(75) Inventor: Katsuo Aoyama, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 363 days.

(21) Appl. No.: 11/044,229

(22) Filed: Jan. 28, 2005

(65) Prior Publication Data
US 2006/0095706 A1 May 4, 2006

(30) Foreign Application Priority Data
Oct. 28, 2004 (JP) ............... 2004-314349

(51) Int. Cl.
*G06F 12/00* (2006.01)
(52) U.S. Cl. .................. 711/114; 711/170; 711/171; 711/172
(58) Field of Classification Search ............. 711/114, 711/170, 171, 172
See application file for complete search history.

(56) References Cited
U.S. PATENT DOCUMENTS 6,715,054 B2 * 3/2004 Yamamoto .......... 711/170
6,766,416 B2 * 7/2004 Bachmat ............. 711/114
7,035,989 B1 * 4/2006 Hinker et al. .......... 711/171
7,080,196 B1 * 7/2006 Kitamura ............. 711/114
7,181,516 B2 * 2/2007 Kaneda et al. ........ 709/223

FOREIGN PATENT DOCUMENTS

| JP | 4-181439 | 6/1992 |
| JP | 6-103123 | 4/1994 |
| JP | 7-84840 | 3/1995 |

* cited by examiner

Primary Examiner—Sanjiv Shah
Assistant Examiner—Daniel Tsui
(74) Attorney, Agent, or Firm—Staas & Halsey LLP

(57) ABSTRACT

A capacity designating unit designates a capacity, which a user desires, of virtual disks provided to a disk pool. A first selecting unit selects one (1) or a plurality of physical disks that satisfy the designated capacity from a disk pool that registers the physical disks such that the number of the selected physical disks is minimized, and assigns the selected physical disks to the virtual disks. A second selecting unit selects one (1) or a plurality of physical disks that satisfy the designated capacity such that the number of extents that is the number of areas that are scattered in the physical disk and are not assigned is minimized, and assigns the selected physical disks when the selection by the first selecting unit is unsuccessful.

27 Claims, 20 Drawing Sheets

| PRIORITY OF SELECTION | CONDITION FOR SELECTING CAPACITY | CONDITION FOR SELECTING WHEN THE CONDITION FOR SELECTING CAPACITY IS SATISFIED |
|---|---|---|
| FIRST | DESIGNATED CAPACITY ≦ CAPACITY OF AN EMPTY EXTENT | TO SELECT AN EXTENT WITH THE MINIMAL CAPACITY |
| SECOND | DESIGNATED CAPACITY ≦ CAPACITY OF AN EMPTY PHYSICAL DISK | TO SELECT A PHYSICAL DISK WITH THE MINIMAL CAPACITY |
| THIRD | DESIGNATED CAPACITY > CAPACITY OF AN EMPTY PHYSICAL DISK | TO SELECT A PHYSICAL DISK WITH THE MAXIMAL CAPACITY |
| FOURTH | DESIGNATED CAPACITY > CAPACITY OF AN EMPTY EXTENT | TO SELECT AN EXTENT WITH THE MAXIMAL CAPACITY |
| FIFTH | DESIGNATED CAPACITY ≦ CAPACITY OF AN EMPTY EXTENT | TO SELECT AN EXTENT WITH THE MINIMAL CAPACITY |

32: FIRST, SECOND, THIRD
34: FOURTH, FIFTH

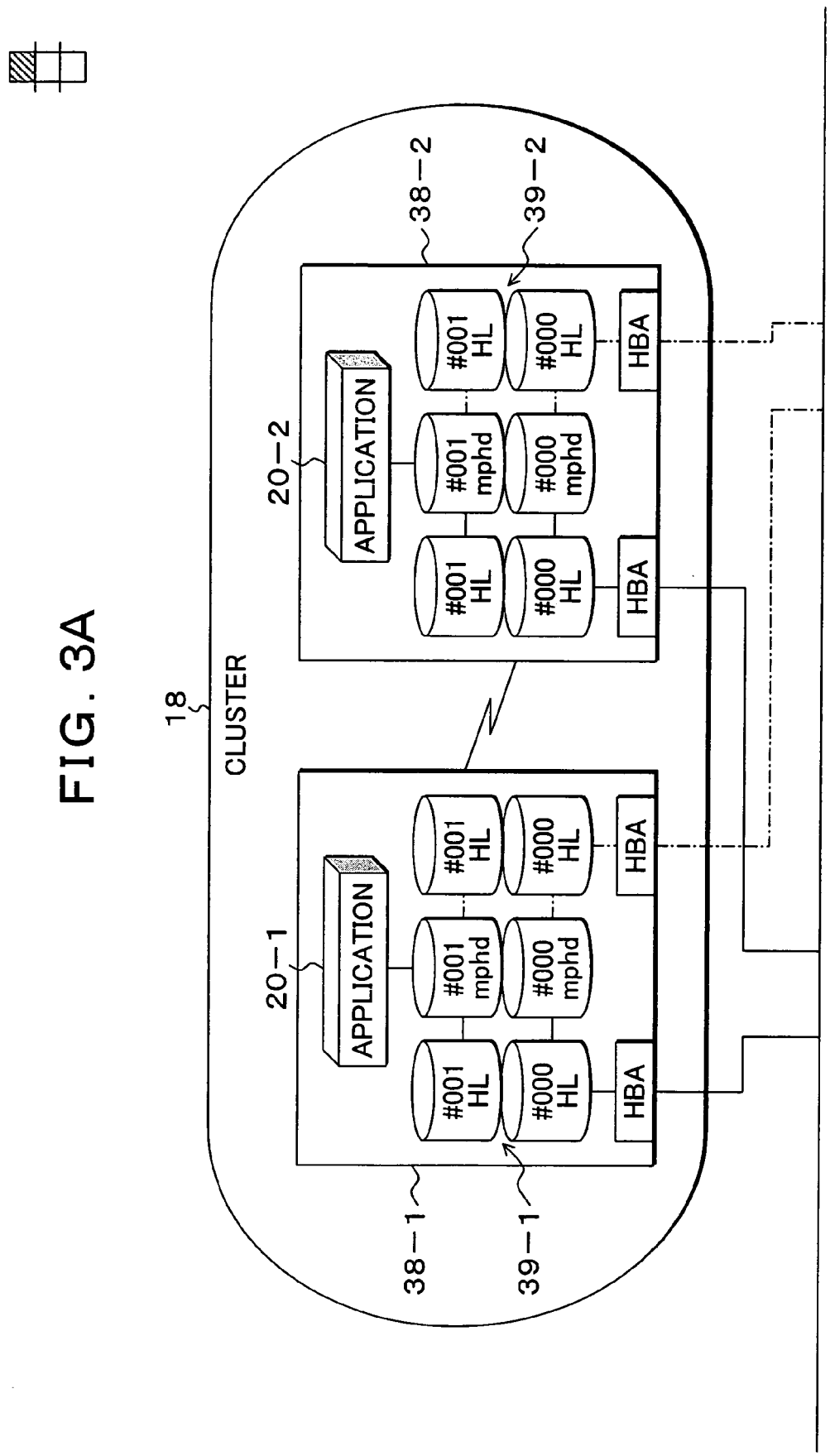

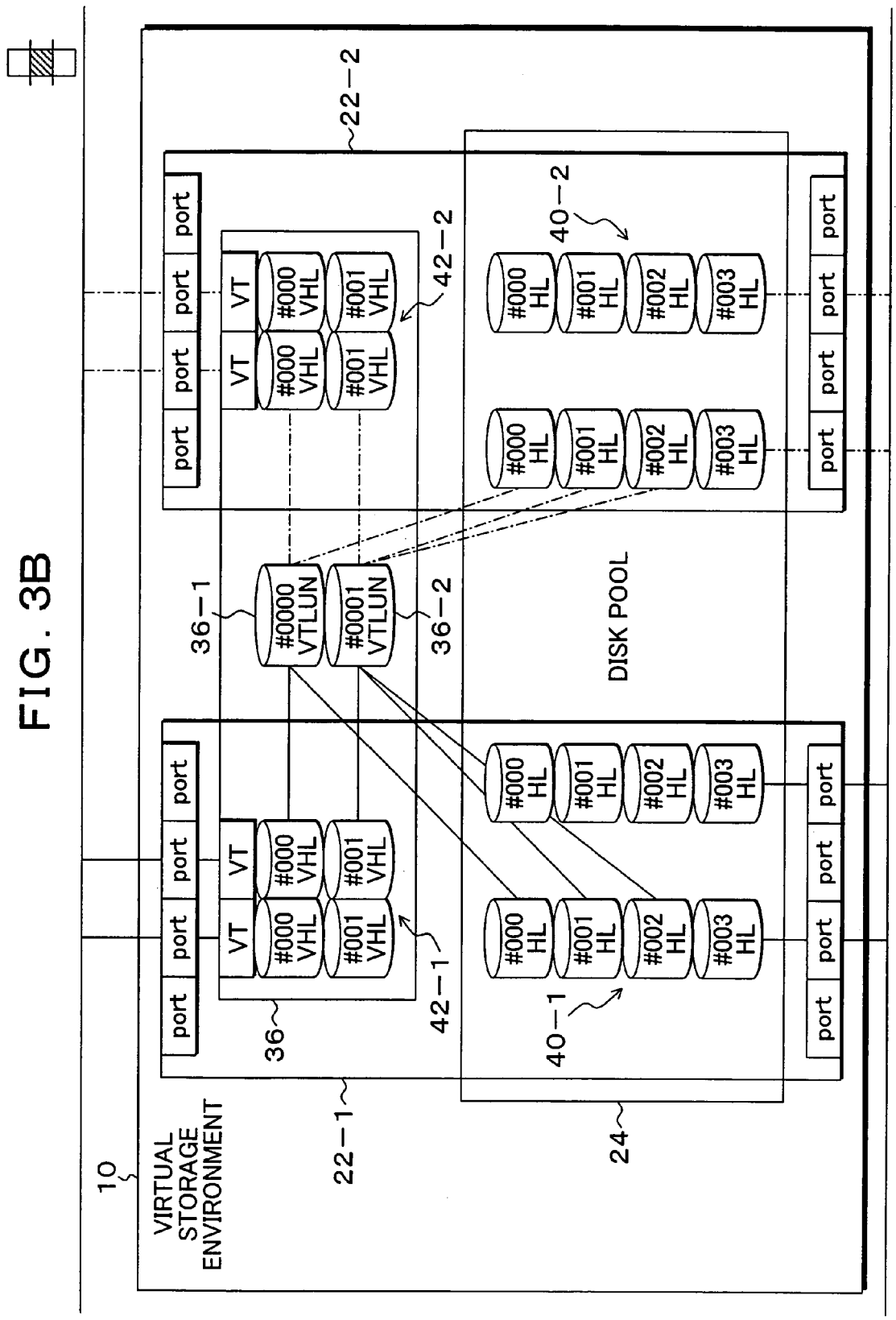

FIG. 5

| PRIORITY | TARGET GROUP OF SELECTION | ORDER OF SELECTION OF PHYSICAL DISK GROUPS BELONGING TO A GROUP |
|---|---|---|
| FIRST | A PHYSICAL DISK GROUP FOR EACH PATH AS UNIT CONNECTED WITH A VIRTUALIZATION SWITCH | ORDER OF PHYSICAL DISK GROUPS WITH VIRTUALLY UNASSIGNED RATES GETTING SMALLER SUCH THAT CONNECTING PATHS ARE NOT CONCENTRATED |
| SECOND | A PHYSICAL DISK GROUP FOR EACH RAID APPARATUS AS UNIT CONNECTED WITH A VIRTUALIZATION SWITCH | ORDER OF PHYSICAL DISK GROUPS WITH VIRTUALLY UNASSIGNED RATES GETTING SMALLER SUCH THAT RAID APPARATUSES ARE NOT CONCENTRATED |
| THIRD | ALL OF RAID APPARATUSES CONNECTED WITH VIRTUALIZATION SWITCHES | — |

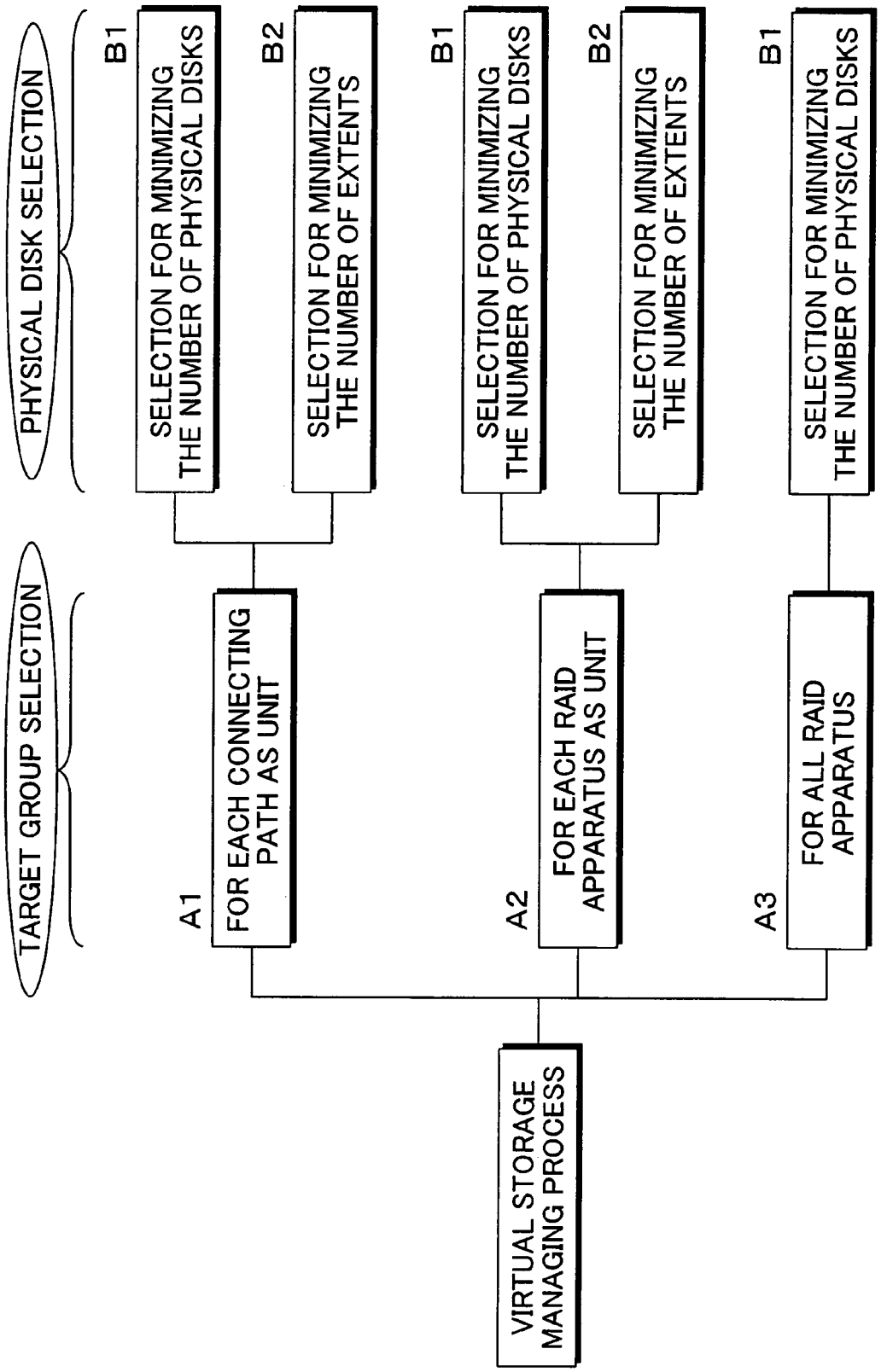

FIG. 7A

| PRIORITY OF SELECTION | CONDITION FOR SELECTING CAPACITY | CONDITION FOR SELECTING WHEN THE CONDITION FOR SELECTING CAPACITY IS SATISFIED |
|---|---|---|
| FIRST | DESIGNATED CAPACITY ≦ CAPACITY OF AN EMPTY EXTENT | TO SELECT AN EXTENT WITH THE MINIMAL CAPACITY |
| SECOND | DESIGNATED CAPACITY ≦ CAPACITY OF AN EMPTY PHYSICAL DISK | TO SELECT A PHYSICAL DISK WITH THE MINIMAL CAPACITY |
| THIRD | DESIGNATED CAPACITY > CAPACITY OF AN EMPTY PHYSICAL DISK | TO SELECT A PHYSICAL DISK WITH THE MAXIMAL CAPACITY |
| FOURTH | DESIGNATED CAPACITY > CAPACITY OF AN EMPTY EXTENT | TO SELECT AN EXTENT WITH THE MAXIMAL CAPACITY |
| FIFTH | DESIGNATED CAPACITY ≦ CAPACITY OF AN EMPTY EXTENT | TO SELECT AN EXTENT WITH THE MINIMAL CAPACITY |

Rows FIRST–THIRD: 32
Rows FOURTH–FIFTH: 34

| PRIORITY OF SELECTION | PRIORITY OF SELECTION WHEN EXTENTS OF A PLURALITY OF PHYSICAL DISKS ARE SELECTED | CONTENT OF SELECTION PRIORITY |
|---|---|---|
| FIRST | 1. ORDER OF RAID LEVEL | ORDER OF (0+1)→1→5→0 |
| FOURTH | 2. ORDER IF ID OF PHYSICAL DISK | WHEN A PLURALITY OF PHYSICAL DISKS ARE PRESENT AT THE RAID LEVEL |
| FIFTH | 3. ORDER OF LBA OF PHYSICAL DISK | WHEN A PLURALITY OF EXTENTS ARE PRESENT IN A PHYSICAL DISK |
| SECOND | 1. ORDER OF INCREASING NUMBER OF EXTENTS | |
| THIRD | 2. ORDER OF RAID LEVEL | ORDER OF (0+1)→1→5→0 |
| | 3. ORDER OF ID OF PHYSICAL DISK | WHEN A PLURALITY OF PHYSICAL DISKS ARE PRESENT AT THE RAID LEVEL |

FIG. 7B

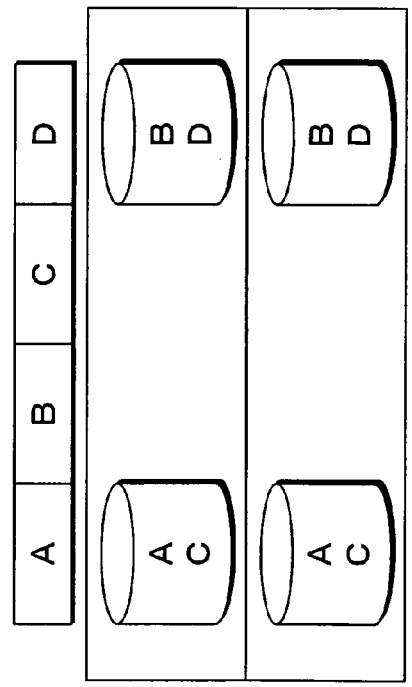

FIG. 7C

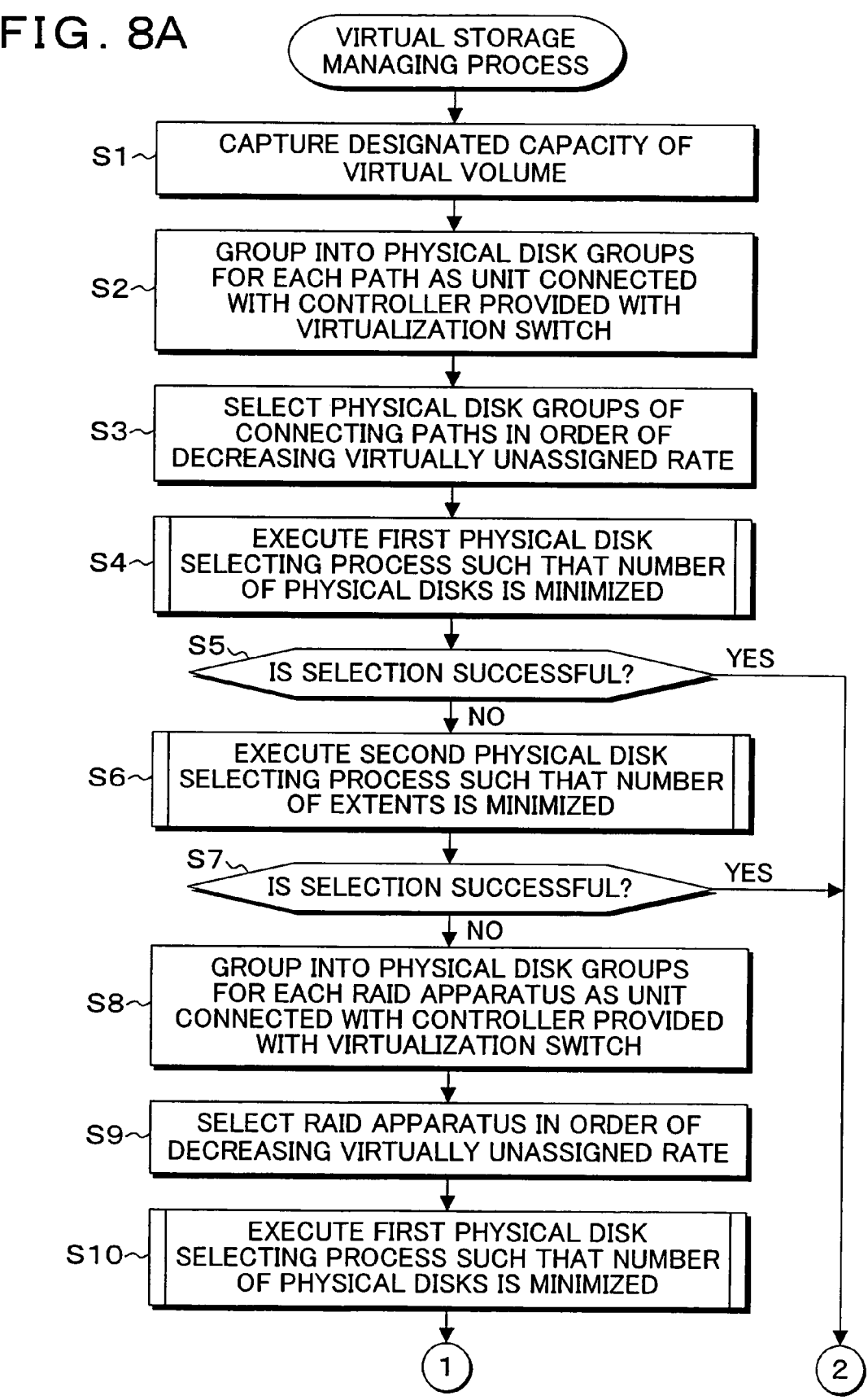

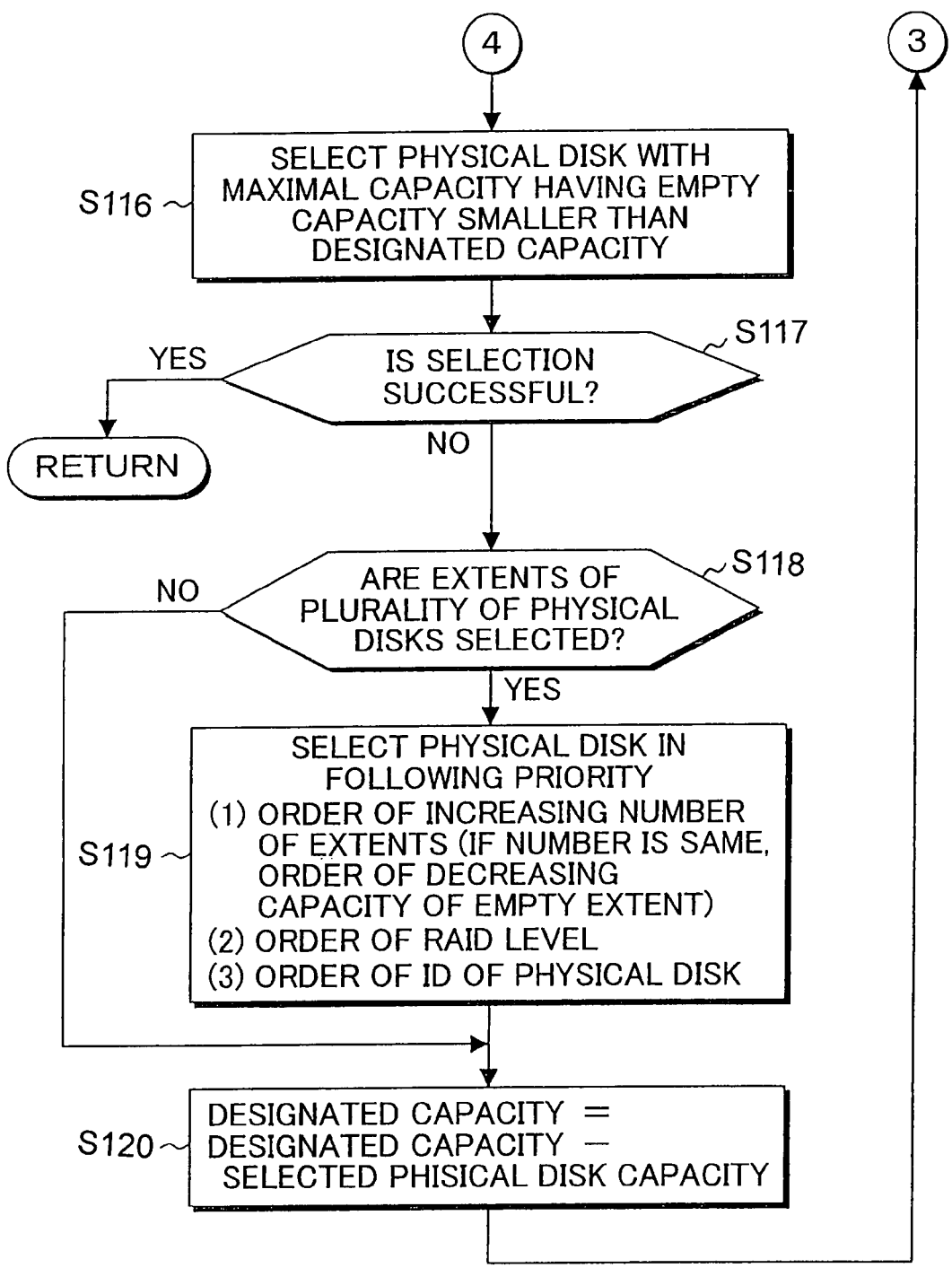

| DESIGNATED CAPACITY | SELECTION RESULT | SORTING RESULT |
|---|---|---|
| 1~10 | d | d |
| 11~20 | b | b |
| 21~30 | a | a |
| 31~40 | c, b | b, c |
| 41~50 | c, b | b, c |
| 51~60 | c, b, d | b, c, d |
| 61~70 | c, b, a | a, b, c |
| 71~80 | c, b, a | a, b, c |
| 81~90 | c, b, a, d | a, b, c, d |
| 91~100 | c, b, a, d, e | a, b, c, d, e |
| 101~110 | c, b, a, d, e, f | a, b, c, d, e, f |

| DESIGNATED CAPACITY | SELECTION RESULT | SORTING RESULT |
|---|---|---|
| 200 | a~j, m~v | (1)(2)(3) |
| | k, w, l, x, a~j | (4)(5)(6)(7) |
| | a~j, k, l, w, x | (8) |

PROGRAM, METHOD AND APPARATUS FOR VIRTUAL STORAGE MANAGEMENT THAT ASSIGNS PHYSICAL VOLUMES MANAGED IN A POOL TO VIRTUAL VOLUMES

CROSS-REFERENCE TO RELATED APPLICATION

This application claims the benefit of priority from prior application No. JP 2004-314349, filed Oct. 28, 2004, in Japan.

BACKGROUND OF THE INVENTION

1. Field of the Invention

The present invention relates generally to a program, method and apparatus for virtual storage management that assign physical volumes managed in a pool to virtual volumes having a capacity designated by a user, and more particularly, to a program, method and apparatus for virtual storage management that select logic volumes such that the logic volumes satisfies reliability, serviceability and performance to assign the selected logic volumes to virtual volumes.

2. Description of the Related Art

Conventionally, a virtual storage system has been known, that collectively manages a plurality of disk storages by making those storages virtual, and assigns virtual volumes to a server. In such a virtual storage system, the disk storages that have been made virtual are arranged between a server and physical disks and the server accesses the virtual disks managed as being virtual. Thereby, operation and management of the physical storages can be completely separated from the server and an open storage area network (SAN) environment that does not rely on any hardware can be constructed. A virtual storage system is realized by a control apparatus that is arranged between a server and physical storages and executes a virtual storage management program. This control apparatus constructs for the server a virtual storage environment consisting of a storage pool that registers the physical disks and switches that are made virtual, and assigns a physical disk having a capacity that a user desires corresponding to an application of the server, to a virtual disk from the storage pool. As the conventional assignment of physical disks constituting virtual disks, physical disks are assigned after executing appropriate sizing to a capacity designated by a user in designing of the system configuration. A system is known that divides apparatuses into groups by type and assigns physical apparatuses to virtual disks for each group in the case where a plurality of types of apparatuses such as a magnetic disk apparatus, an optical disk apparatus and a semiconductor memory apparatus are present being mixed as logic volumes. However, as the assignment of the physical apparatuses to the virtual apparatuses, the physical apparatuses are assigned after executing appropriate sizing in designing of the system configuration, similarly to the above.

However, in such a method of assigning physical disks to virtual disks after executing appropriate sizing in a conventional system configuration design, whether or not the physical disks are disks that have not yet been assigned is determined when the physical disks are assigned to the virtual disks, and physical disks that are not yet assigned are selected and assigned. Therefore, each capacity designated by a user is limited to a whole number times as large as the capacity of a physical disk and, thus, the capacity designated by the user tends to be larger than a necessary capacity. Therefore, wasteful assigned volumes are generated by the capacity over-assigned. In order to assign physical disks corresponding to a capacity designated by a user, it is necessary to assign a portion of areas of physical disks that are not yet assigned. Therefore, the disks that are the target of the assignment include disks that are not yet assigned and the disks that are partially not assigned, being mixed. As a result, assignment to the virtual disks taking into account not only the disks that are not yet assigned but also the disks that are partially not yet assigned is necessary. However, it is still remains as a task, that what type of assignment method should be constructed for the disks that are partially not assigned. Furthermore, it is also remains as a significant task, that how the physical disks that can constitute the virtual disks that are optimal for a user application should be assigned based on the specifications such as the configuration and performance of RAID apparatuses constituting the physical disks and a controller of those RAID apparatuses.

SUMMARY OF THE INVENTION

According to the present invention there are provided a program, method and apparatus for virtual storage management, operable to assign the optimal physical disks constituting virtual disks including physical disks that are partially not yet assigned. The present invention provides a virtual storage management program executed by a computer of an apparatus arranged between a group of physical volumes such as RAID apparatuses and a higher-order apparatus such as a server. A virtual volume is a higher-order concept of a virtual disk, and a physical volume is a higher-order concept of an actual disk or a physical disk. The virtual storage management program of the present invention is operable to drive a computer to execute:

a capacity designation step of designating the capacity of virtual volumes;

a fist selection step of selecting one (1) or a plurality of physical volumes which satisfy the designated capacity from a pool which registers the physical volumes such that the number of selected physical volumes is minimized and assigning the selected physical volumes to the virtual volumes;

a second selection step of selecting one (1) or a plurality of physical volumes which satisfy the designated capacity such that the number of extents is minimized which is the number of unassigned areas dispersed in the selected physical volumes and assigning the selected physical volumes to the virtual volumes if the selection is unsuccessful at the first selection step.

In this case, the first selection step comprises:

a first priority selection step of selecting an extent having an available capacity which is equal to or larger than the designated capacity and which is the minimal capacity;

a second priority selection step of selecting a physical volume having an available capacity which is equal to or larger than the designated capacity and which is the minimal capacity if the selection is unsuccessful at the first priority selection step; and a third priority selection step of selecting a physical volume having an available capacity which is smaller than the designated capacity and which is the maximal capacity if the selection is unsuccessful at the second priority selection step.

The first priority selection step includes, when the extents of a plurality of physical volumes are selected, first, selecting the plurality of physical volumes in order of RAID levels of level (0+1), level 1, level 5 and level 0;

second, selecting the plurality of physical volumes in order of IDs of the physical volumes if the physical volumes can not be selected based on the RAID levels thereof; and third, selecting the plurality of physical volumes in order of logic block addresses LBAs of the physical volumes if the physical volumes can not be selected based on the IDs thereof, whilst the second or the third priority selection step includes, when the extents of a plurality of physical volume are selected, first, selecting the plurality of physical volumes in order of ascending number of extents;

second, selecting the plurality of physical volumes in order of the RAID levels of level (0+1), level 1, level 5 and level 0 if the physical volumes can not be selected based on the number of extents;

third, selecting the plurality of physical volumes in order of IDs of the physical volumes if the physical volumes can not be selected based on the RAID levels thereof; and fourth, selecting the plurality of physical volumes in order of logic block address LBA of the physical volumes if the physical volumes can not be selected based on the IDs thereof.

The second selecting step comprises:

a fourth priority selection step of selecting an extent having an available capacity which is smaller than the designated capacity and which is the maximal capacity; and a fifth priority selection step of selecting an extent having an available extent capacity which is equal to or larger than the designated capacity and which is the minimal capacity if the selection is unsuccessful at the fourth priority selection step.

The fourth and the fifth priority selection steps include, when extents of a plurality of physical volumes are selected, first, selecting the plurality of physical volumes in order of the RAID levels of level (0+1), level 1, level 5 and level 0;

second, selecting the plurality of physical volumes in order of IDs of the physical volumes if the physical volumes can not be selected based on the RAID levels thereof; and third, selecting the plurality of physical volumes in order of the logic block addresses LBAs of the physical volumes if the physical volumes can not be selected based on the IDs thereof.

The virtual storage management program of the present invention is further operable to drive the computer to execute a target group selection step of dividing the physical volume groups into groups prior to the first and the second selection steps and selecting each group one after another for execution of the first and the second selection steps.

The target group selection step comprises:

a first target group selection step of dividing a plurality of physical disk groups into groups respectively for each connection path connecting to controllers provided with virtual switch features, and selecting each group one after another for execution of the first and the second selection steps;

a second target group selection step of dividing a plurality of physical volume groups into groups for each RAID apparatus connected with the plurality of controllers, and selecting each group one after another for execution of the first and the second selection steps when the selection is unsuccessful at the first target group selection step; and a third target group selection step of selecting the physical volume groups regarding all the RAID apparatuses connected with the controllers as one (1) group for execution of the first and the second selection steps when the selection is unsuccessful at the second target group selection step.

The first target group selection step includes classifying connection paths with the plurality of physical volume groups into first connection paths that are not aware of the controllers of the physical volume groups and primary-connected second connection paths primary-connected with awareness of the controllers, and dividing physical volume groups into physical volume groups for each of the first connection paths and physical volume groups for each of the second connection paths for selection one after another. The first target group selection step includes selecting each group in order of physical volume group having a descending rate of virtually unassigned capacity which is the rate of the total capacity not assigned against the total capacity such that the connection paths pertaining to the physical volumes constituting the virtual volumes are balanced among the physical volumes. The second target group selection step includes selecting each group in order of RAID apparatus having a descending rate of virtually unassigned capacity which is the rate of the total capacity not assigned against the total capacity such that the RAID apparatuses pertaining to the physical volumes constituting the virtual volumes are balanced among the physical volumes.

The present invention provides a virtual storage management method. The virtual storage management method of the present invention comprises:

a capacity designation step of designating the capacity of virtual volumes provided in a virtual storage pool;

a fist selection step of selecting one (1) or a plurality of physical volumes which satisfy the designated capacity from the pool which registers the physical volumes such that the number of selected physical volumes is minimized and assigning the selected physical volumes to the virtual volumes;

a second selection step of selecting one (1) or a plurality of physical volumes which satisfy the designated capacity such that the number of extents is minimized which is the number of unassigned areas dispersed in the selected physical volumes and assigning the selected physical volumes to the virtual volumes if the selection is unsuccessful at the first selection step.

The present invention provides a virtual storage management apparatus. The virtual storage management apparatus comprises:

a capacity designation unit configured to designate the capacity of virtual volumes provided in a virtual storage pool;

a fist selection unit configured to select one (1) or a plurality of physical volumes which satisfy the designated capacity from the pool which registers the physical volumes such that the number of selected physical volumes is minimized, and assign the selected physical volumes to the virtual volumes;

a second selection unit configured, if the selection is unsuccessful by the first selection unit, to select one (1) or a plurality of physical volumes which satisfy the designated capacity such that the number of extents is minimized which is the number of unassigned areas dispersed in the selected physical volumes, and assign the selected physical volumes to the virtual volumes.

The details of the method and apparatus for virtual storage management in accordance with the present invention will become basically the same as those of the virtual storage management program of the present invention.

According to the present invention, only by designating a capacity of a virtual volume that a user desires, to a virtual module management program of an apparatus arranged between a server and RAID apparatuses, physical volumes in a storage pool are first selected and assigned to the virtual volumes such that the number of the selected physical volumes is minimized. Then, because the number of the physical volumes assigned to virtual volumes is minimized, points that are factors for generating faults are minimized and, therefore, reliability and serviceability can be improved. Even when the selection that minimizes the number of the physical volumes is not successful, physical volumes in the storage pool are selected and assigned to the virtual volume such that the number of extents that are the areas not used in the physical volumes partially not used is minimized, and fragmentation (being scattered into fragments) can be minimized. Thereby, degradation of access performance can be prevented. On the other hand, in assigning the physical volumes to the virtual volumes, the optimal assignment of the physical volumes taking into account the performance can be achieved by classifying the physical volume groups in the storage pool into groups in order of performance thereof such as for each path, each RAID apparatus and all the RAID apparatuses in a physical volume, selecting each group in order of degrading performance and assigning the physical volumes that constitute the virtual volumes. The above and other objects, features and advantages of the present invention will become more apparent from the following detailed description with reference to the drawings.

BRIEF DESCRIPTION OF THE DRAWINGS

FIGS. 3A to 3C are explanatory views of a physical storage environment and a virtual storage environment in the system of FIG. 1;

FIG. 5 is an explanatory view of a selection procedure of physical disk apparatuses used in the virtual storage management of the present invention;

FIG. 6 is an explanatory view of target groups selection used in the virtual storage management of the present invention;

FIGS. 7A to 7C are explanatory views of a priority selection mode used in physical disk selection of the present invention;

FIG. 8A is a flowchart of a virtual storage management process according to the present invention;

FIG. 9C is a flowchart continued from FIGS. 9A and 9B;

DETAILED DESCRIPTION OF THE PREFERRED EMBODIMENT

Figure 1:
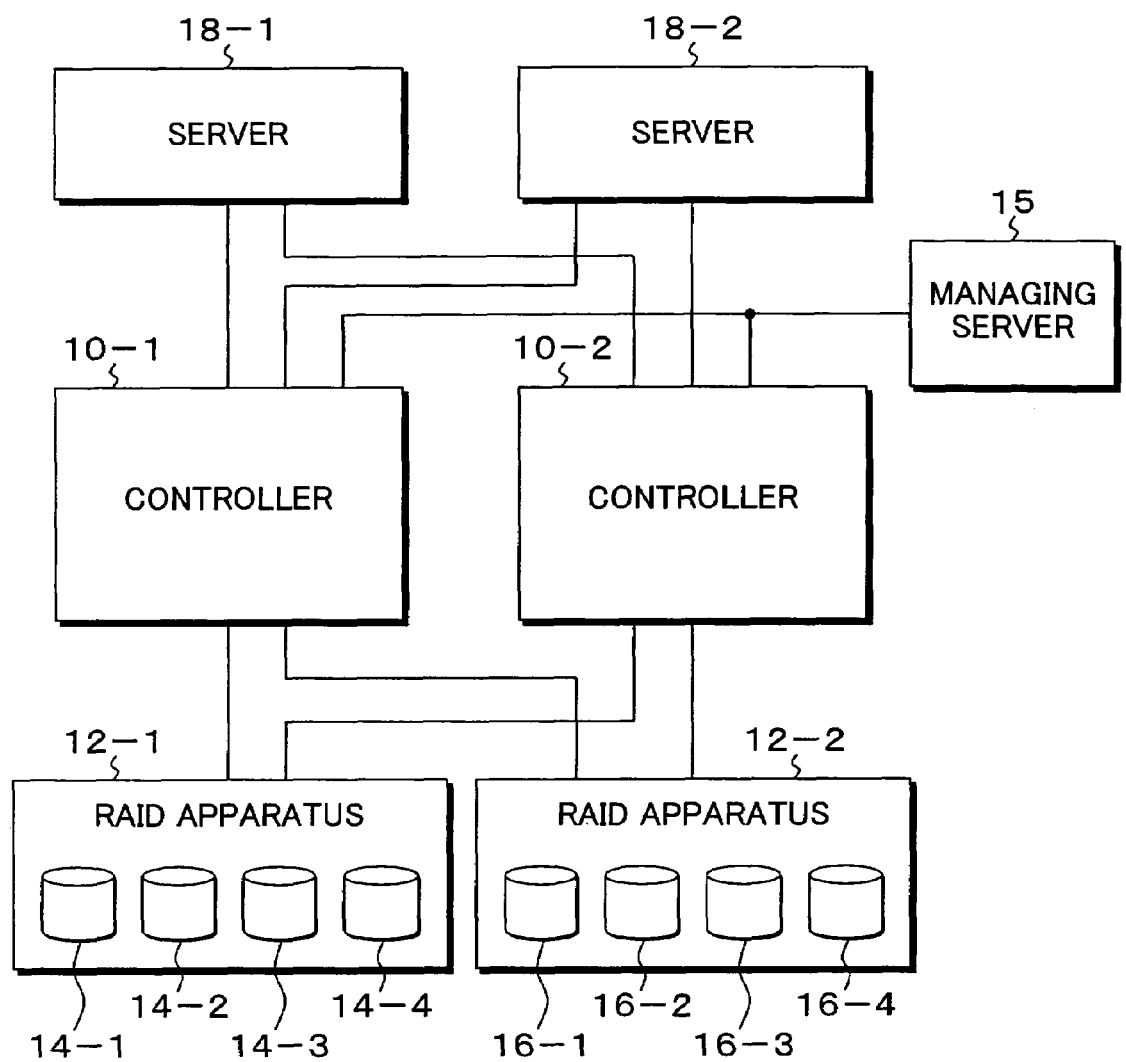
FIG. 1 is a block diagram of the system configuration applicable to a virtual storage management process of the present invention.

FIG. 1 is a block diagram of the system configuration applicable to a virtual storage management process of the present invention. In the following description of an embodiment, an example of the case where a virtual volume is handled as a virtual disk and a physical volume as a physical disk is taken. In FIG. 1, controllers 10-1 and 10-2 that execute the virtual storage management process of the present invention are arranged between servers 18-1 and 18-2 and RAID apparatuses 12-1 and 12-2. A managing server 15 that manages remotely the controllers 10-1 and 10-2 is installed with a virtual storage management program of the present invention and realizes a virtual storage environment to which virtual disks having the capacity necessary for the server 18-1 and 18-2 are assigned, by hiding the type, arrangement and capacity of the physical RAID apparatuses 12-1 and 12-2 against accesses from the servers 18-1 and 18-2 by, when the virtual storage management program is executed, creating a disk pool (storage pool) that registers physical module groups as the RAID apparatuses 12-1 and 12-2. The RAID apparatuses 12-1 and 12-2 are respectively provided with physical disk apparatuses 14-1 to 14-4 and 16-1 to 16-4 as logic volumes. The RAID apparatuses 12-1 and 12-2 are connected with the controllers 10-1 and 10-2 through a channel adaptor CA and are respectively connected with the physical disk apparatuses 14-1 to 14-4 and 16-1 to 16-4 through a device adaptor DA, and a controller CM is provided between the channel adaptor CA and the device adaptor DA. Therefore, each of the RAID apparatuses 12-1 and 12-2 constitutes a sub-system of an external storage for a higher-order apparatus thereof.

Figure 2A:
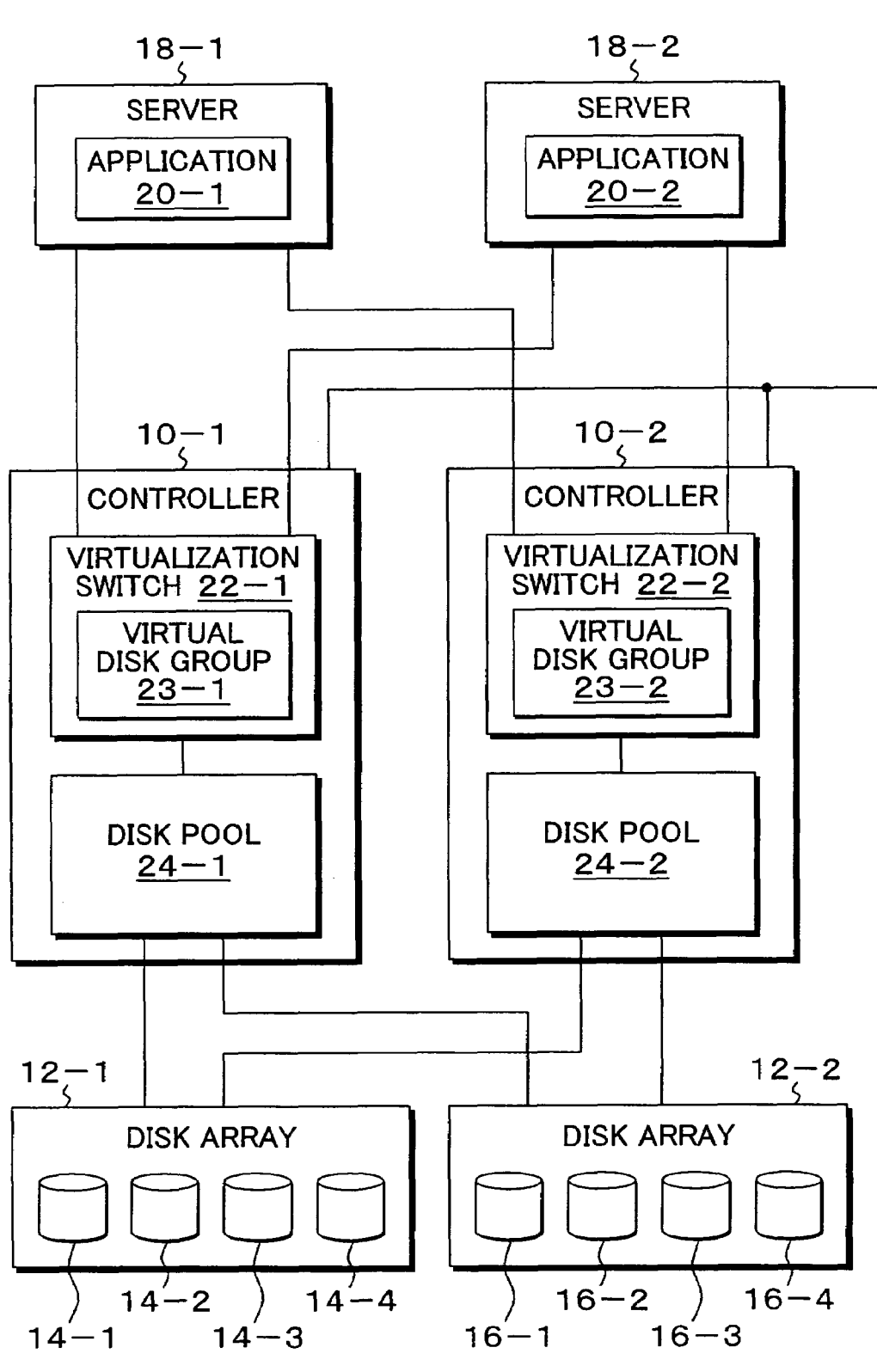
FIGS. 2A and 2B are block diagrams showing a functional configuration of a virtual storage environment to which controllers are provided for the system of FIG. 1.
Figure 2B:
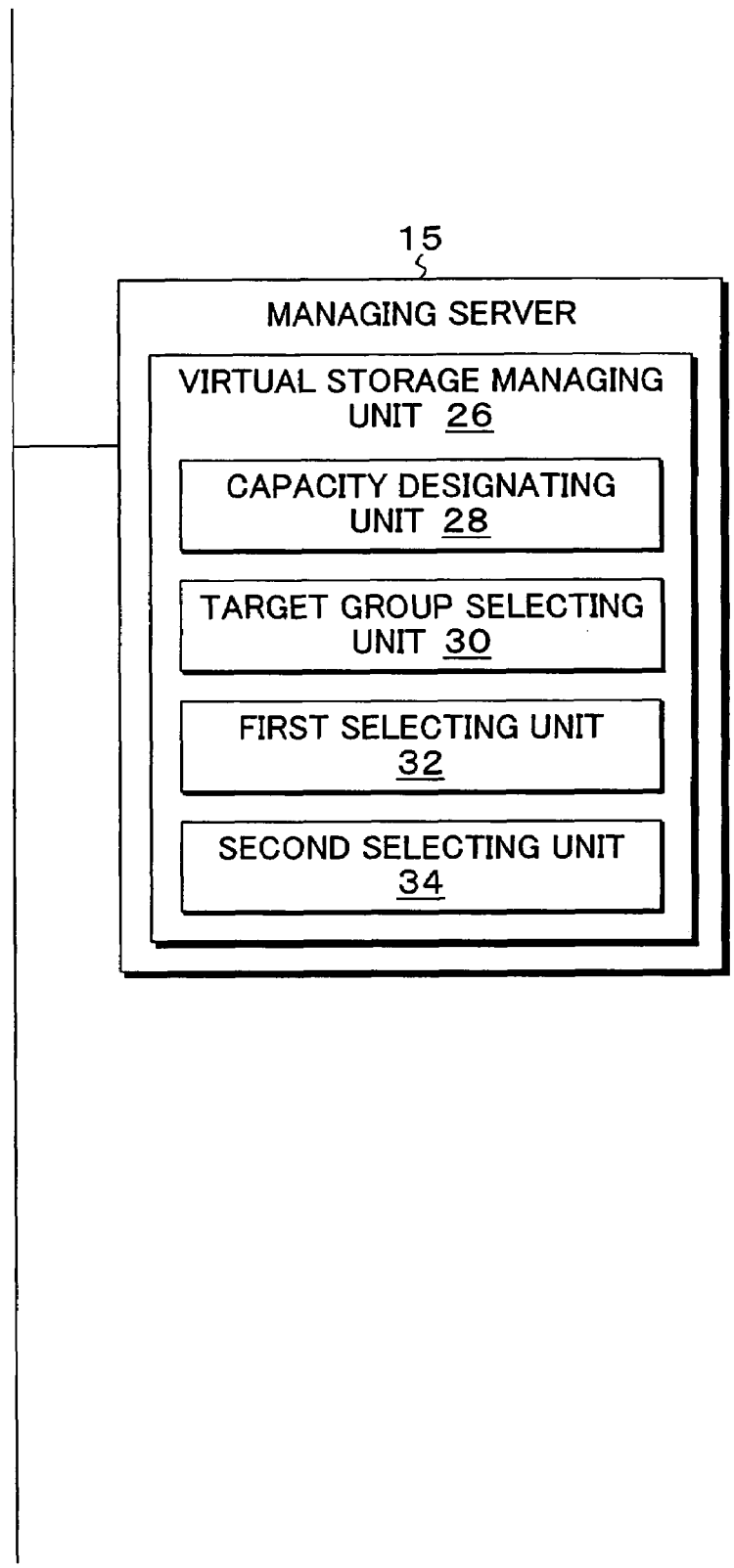

FIGS. 2A and 2B are block diagrams showing a functional configuration of the virtual storage environment for the system of FIG. 1. In FIGS. 2A and 2B, each of the servers 18-1 and 18-2 is provided respectively with each of applications 20-1 and 20-2 of a user. Because these servers 18-1 and 18-2 respectively take a cluster configuration, the applications 20-1 and 20-2 are same and are operated with, for example, the server 18-1 as the main. When the server 18-1 is down, switching to the server 18-2 (take-over) is executed. The controllers 10-1 and 10-2 that provide the virtual storage environment to the servers 18-1 and 18-2 are also made redundant and respectively constitute a virtual disk provided to the virtual storage environment due to the assignment of the physical disks 14-1 to 14-4 and 16-1 to 16-4 of the RAID apparatuses 12-1 and 12-2. Therefore, in the controllers 10-1 and 10-2, the virtual storage environment having a same content is always realized even when only one (1) of the controllers 10-1 and 10-2 is operating and, when the server 18-1 is down and is switched to the server 18-2, operation by the server 18-2 that is the switching destination and utilizes the same virtual storage environment can be realized without the need to switch the virtual storage environment. The controllers 10-1 and 10-2 are respectively provided with virtualization switches 22-1 and 22-2 and disk pools 24-1 and 24-2. The disk pools 24 registers physical disk apparatuses 14-1 to 14-4 and 16-1 to 16-4 provided on the side of the RAID apparatuses 12-1 and 12-2. The controllers 10-1 and 10-2 are connected with a managing server 15 and a virtual storage management unit 26 is provided to the managing server 15. When designation of a desired capacity has been executed to a virtual disk apparatus, the virtual storage management unit 26 executes selection of the physical disk apparatuses 14-1 to 14-4 and 16-1 to 16-4 provided on the side of the RAID apparatuses 12-1 and 12-2 and executes assignment of physical disk apparatuses to constitute virtual disks that satisfy the designated capacity. The virtualization switches 22-1 and 22-2 construct the connection relation between virtual disks provided to virtual disk groups 23-1 and 23-2 and the physical disk apparatuses assigned from the disk pools 24-1 and 24-2. The virtual storage management unit 26 is a CPU on the managing server 15 that manages remotely the controllers 10-1 and 10-2, is a function realized by executing the virtual storage management program of the present invention and is provided with functions of a capacity designating unit 28, a target group selecting unit 30, a first selecting unit 32 and a second selecting unit 34. Having received an order of a capacity desired by a user necessary for operation of the applications 20-1 and 20-2 of the servers 18-1 and 18-2, the capacity designating unit 28 designates the capacity to be assigned from the physical disk apparatuses to the virtual disks. When physical disk apparatuses are selected from the disk pools 24-1 and 24-2 and are assigned to the virtual disks that have received the designation of the capacity from the user, the target group selecting unit 30 executes assignment of the physical disk apparatuses by dividing the physical disk groups that are the target of selection into groups and selecting each group according to a predetermined priority. As will be clear in the following description, in the present invention, the selection of the target groups of the physical disk groups is executed by dividing those groups into groups in the following manner.

(1) For each connection path connected with the controllers 10-1 and 10-2;
(2) For each RAID apparatus connected with the controllers 10-1 and 10-2; and
(3) For all of the RAID apparatuses connected with the controllers 10-1 and 10-2.

A first selecting unit 32 selects one (1) or a plurality of physical disks that satisfy the designated capacity from the physical disk groups of the groups selected by the target group selecting unit 30 as target such that the number of the physical disks is minimized, and assigns the selected physical disks to the virtual disks. When the selection by the first selecting unit is not successful, the second selecting unit 34 selects one (1) or a plurality of physical disks that satisfy the designated capacity such that the number of the extents that is the number of the areas scattered in the physical disk apparatuses and not yet assigned is minimized, and assigns the selected physical disks to the virtual disks. Such a functional configuration of the controller 10-1 is same as that of the controller 10-2.

Figure 3C:
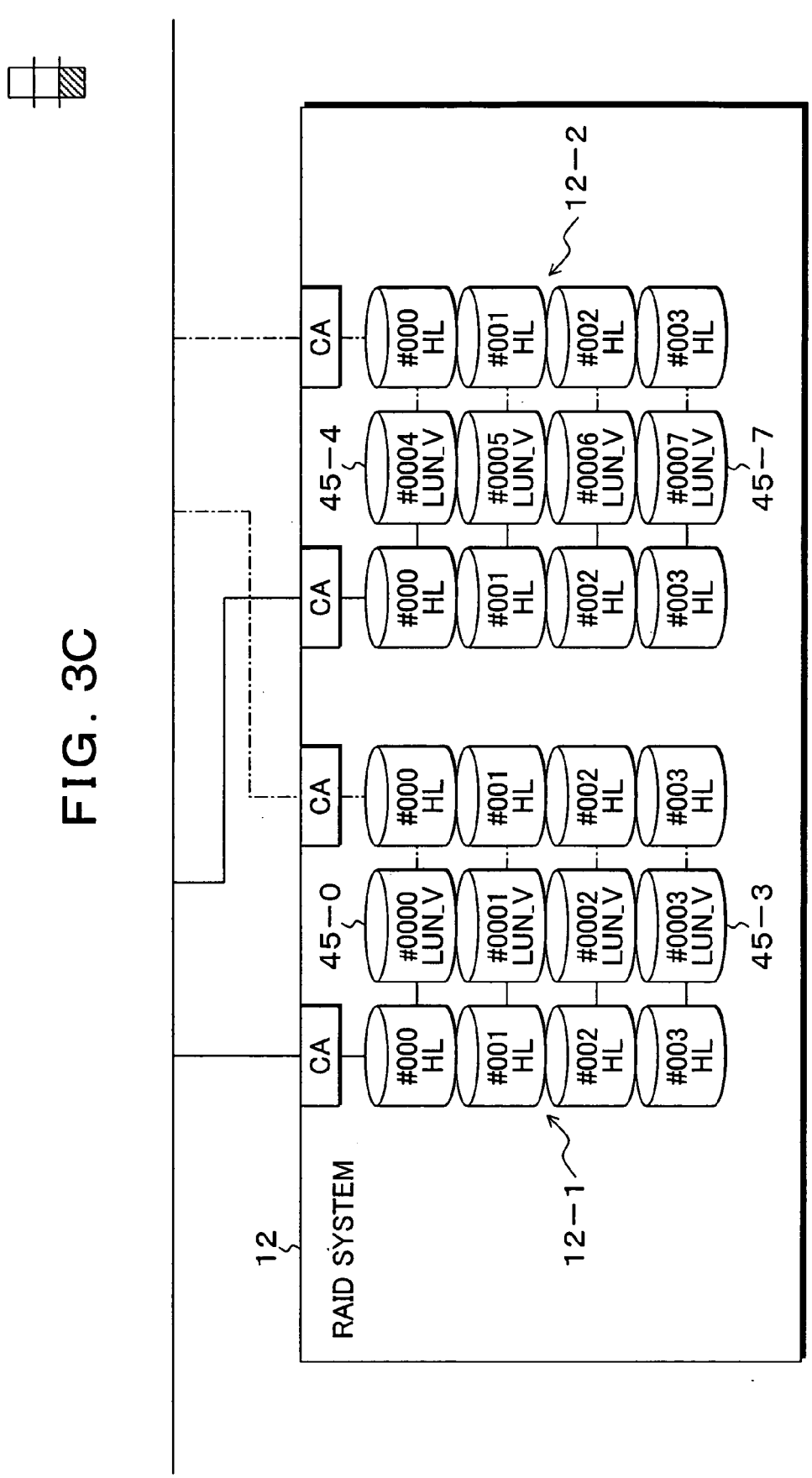

FIGS. 3A to 3C are explanatory views of the physical storage environment and the virtual storage environment in the system of FIGS. 2A and 2B. The servers 18-1 and 18-2 constituting a cluster 18 are provided with logic disks (logic volumes) 38-1 and 38-2 each having #000 and #001 as host logic unit addresses HL and are connected with the applications 20-1 and 20-2 through a multi-path drive mphd. The logic disks 38-1 and 38-2 of the servers 18-1 and 18-2 correspond respectively to virtual housings 36-1 and 36-2 respectively having #0001 and #0001 as the virtual logic unit addresses of a virtual housing 36 provided to the virtual storage environment realized by consolidating the functions of the controllers 10-1 and 10-2 of FIGS. 2A and 2B. Portions respectively having #000 and #001 as addresses of an address virtual host logic unit VHL are route information paths 42-1 and 42-2 for ports connected with the servers 18-1 and 18-2. On the other hand, the RAID system 12 is constructed using the RAID apparatuses 12-1 and 12-2 of FIGS. 2A and 2B by consolidating those apparatuses as a physical module group. The RAID system 12 is provided with the RAID apparatus 12-1 provided with four (4) magnetic disk apparatuses 45-0 to 45-3 respectively having #0000 to #0003 as the logic unit addresses LUN, and the RAID apparatus 12-2 provided with four (4) magnetic disk apparatuses 45-4 to 45-7 respectively having #0004 to #0007. Two (2) series of units respectively having addresses HL #0000 to #0007 shown on the side of the channel adaptors are route information for the ports on the side of the virtual storage environment 10. The disk pool 24 of the virtual storage environment 10 registers physical disk groups 40-1 and 40-2 having #000 to #003 as the logic unit addresses HL corresponding to the magnetic disk apparatuses 45-0 to 45-7 of the RAID system 12. The virtualization switches 22-1 and 22-2 construct connection paths with the physical disks in the physical disk groups 40-1 and 40-2 in the disk pool 24, assigned to the virtual disks 36-1 and 36-2 in the virtual housing 36 such that the designated capacity is satisfied. In the RAID system 12, the magnetic disk apparatuses 45-0 to 45-7 constituting the RAID apparatuses 12-1 and 12-2 are shown under the channel adaptors CA. However, in practice, the controllers CM are provided following the channel adaptors CA and the magnetic disk apparatuses 45-0 to 45-7 are connected through the device adaptors DA provided under these controllers CM.

Figure 4:
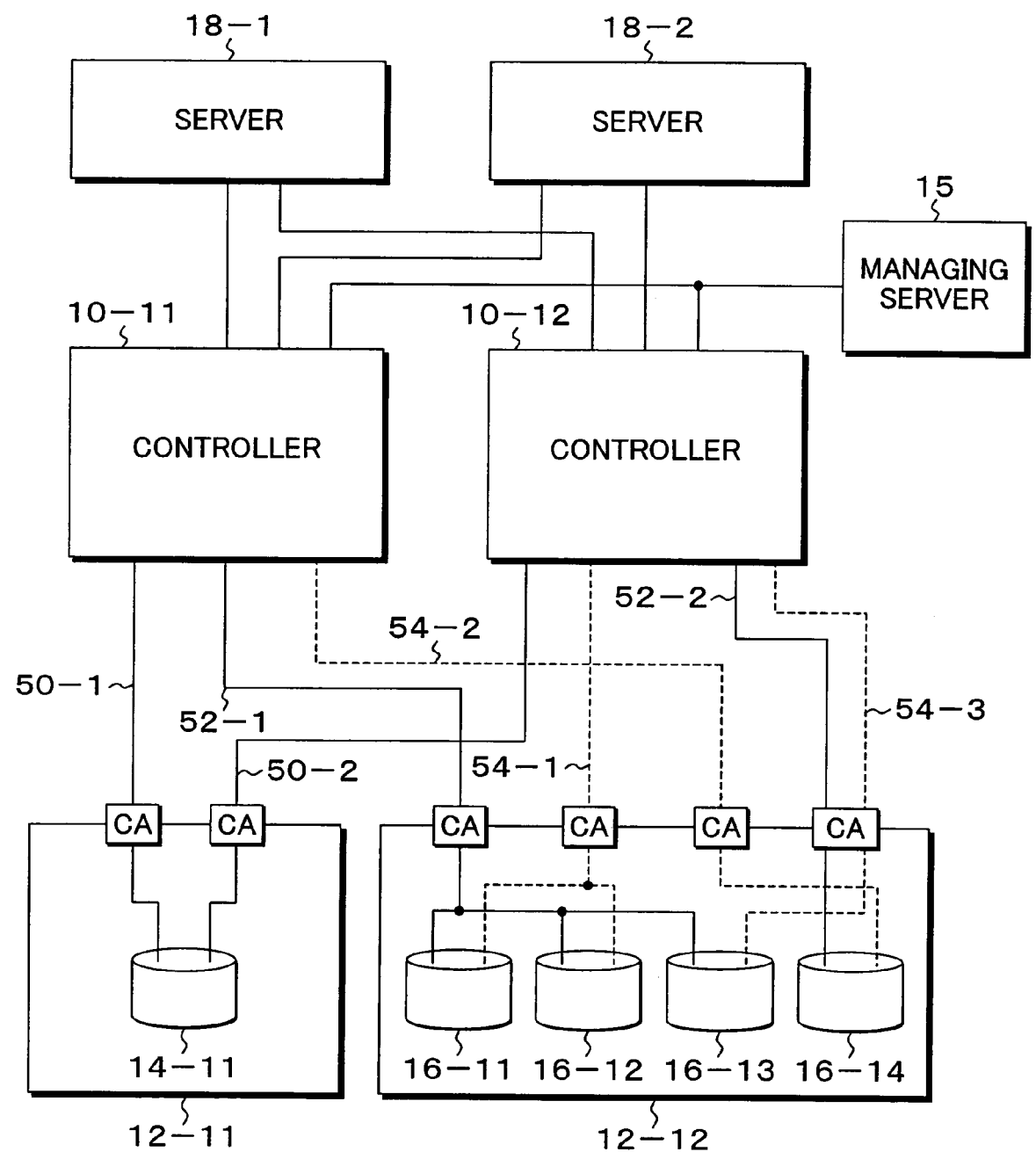
FIG. 4 is a block diagram of the system configuration for which a virtual storage environment is constructed using a controller that is not aware of and a controller that is aware of a controller CM of RAID apparatuses.

FIG. 4 is a block diagram of the system configuration for which a virtual storage environment is constructed by a controller in charge that executes the virtual storage management process of the present invention by connecting, as the physical disk groups, a RAID apparatus that does not need to be aware of the controller CM and a RAID apparatus that needs to be aware of the controller CM. The RAID apparatus 12-11 of FIG. 4 is an apparatus for which the virtual storage management program (virtual storage control manager) of the managing server 15 that manages remotely the controllers 10-11 and 10-12 does not need to be aware of the controller CM in charge, and a model such as ETERNUS6000, GR740, GR820, GR840, etc. manufactured by Fujitsu Ltd. corresponds to this apparatus. In contrast, the RAID apparatus 12-12 is an apparatus for which the virtual storage management program (virtual storage control manager) of the managing server 15 that manages remotely the controllers 10-11 and 10-12 needs to be aware of the controller CM in charge, and a model such as ETERNUS3000, GR710, GR720, GR730, etc. manufactured by Fujitsu Ltd. corresponds to this apparatus. From the viewpoint of the controllers 10-11 and 10-12, as to the RAID apparatus 12-11 which the controller CM in charge need not to be aware of, connection by connection paths 50-1 and 50-2 is executed to virtualization switches of the controllers 10-11 and 10-12. In contrast, from the viewpoint of the controllers 10-11 and 10-12, as to the RAID apparatus 12-12 which the controller CM in charge needs to be aware of, connection by primary connection paths 52-1 and 52-2 and secondary connection paths 54-1 to 54-3 indicated by the dotted line is executed. Then, in the case where the RAID apparatuses 12-11 and 12-12 are used as the physical disk groups as in FIG. 4, target groups of selection are divided into groups according to the priority shown in FIG. 6 as grouping of the target groups of selection for selecting physical disk apparatuses that constitute virtual modules.

In FIG. 5, as the target group of selection having the first priority, the physical disk groups for each path connected with a virtualization switch of the controller are selected one after another. The selection of the physical disk groups for each path connected with the virtual switch in the case of FIG. 4 is limited to, for example, two (2) types of connection paths such as the connection paths 50-1 and 50-2 of the RAID apparatus 12-11 for which the controller in charge does not need to be aware of and, for example, the primary connection paths 52-1 and 52-2 having primary-connection at the RAID apparatus 12-12 for which the controller CM in charge needs to be aware of. Such groups of physical disk groups for each path are selected in the following order.

(1) A physical disk apparatus 14-11 of the connection path 50-1
(2) The physical disk apparatus 14-11 of the connection path 50-2
(3) Physical disk apparatuses 16-11, 16-12 and 16-13
(4) The physical disk apparatus 16-14 of the connection path 52-2

Furthermore, as shown on the right of the target groups of selection, in the case where a plurality of physical disk apparatuses are present in the disk groups that are the target of selection, the physical disk apparatuses are selected in order of physical disk group having a descending rate of virtually unassigned capacity such that the connection paths pertaining to the physical disk apparatuses constituting the virtual disk are balanced among the physical disk apparatuses. Here, the rate of virtually unassigned capacity is defined by the following equation. Rate of virtually unassigned capacity=total capacity of unassigned portions of physical disks÷total capacity of the physical disks (1). The total capacity of unassigned portions of the physical disks is the sum of available capacities of physical disk apparatuses each having been assigned partially and available capacity of physical disk apparatuses each having been not assigned wholly. When selection of the physical disk groups for each path connected with the virtualization switch of the controller as been executed as the selection target having the first priority of FIG. 5 in this manner, selection of physical disk apparatuses that satisfy the designated capacity is executed and are assigned to the virtual disks by the first selecting unit 32 shown in the virtual storage management unit 26 of FIGS. 2A and 2B, from the selected physical disk groups such that the number of the physical disks is minimized. If the selection executed by the first selecting unit 32 is unsuccessful, physical disk apparatuses that satisfy the designated capacity are selected and are assigned to the virtual disks by the second selecting unit 34 such that the number of the extents that is the number of unassigned areas scattered among the physical disk apparatuses is minimized.

FIG. 6 shows the procedure of the virtual storage management process targeting the system configuration of FIG. 4, that describes that, after executing selection A1 of the physical disk groups for each connection path as the target groups of selection, selection B1 is executed that minimizes the number of the physical disks as selection of the physical disks and, if the selection A1 and B1 are unsuccessful, the next selection B2 is executed that minimizes the number of extents. Furthermore, as to the selection A1 for each connection path, if the selection B2 that minimizes the number of the extents is unsuccessful, after the selection A2 for each RAID apparatus as the target groups of selection has been executed next, the selection B1 that minimizes the number of the physical disks is executed similarly and, if the selection B1 is unsuccessful, the selection B2 that minimizes the number of extents is executed. Furthermore, if the selection B2 that minimizes the number of the extents from a RAID apparatus unit A2 as the target group of selection is unsuccessful, all the RAID apparatuses as the target group of selection are selected as a target group A3 and, in this case, only the selection B1 that minimizes the number of the physical disk apparatuses is executed. A target group A2 having a second priority and a target group A3 having a third priority are shown in the cells for the second and the third priority in the table of FIG. 5. For the target group of selection having the second priority, the physical disk groups for each RAID apparatus connected with the virtual switches of the controller is selected as the target group. As to the system configuration of FIG. 4, reviewing this in detail, the physical disk groups are selected in order of the RAID apparatus 12-11 and the RAID apparatus 12-12. As to the order for selecting these RAID apparatuses 12-11 and 12-12, the physical disk groups are selected in order of RAID apparatus having a descending rate of virtually unassigned capacity given by the Eq. (1) such that the RAID apparatus to which the physical disks constituting the virtual disks pertain to are balanced. Moreover, as the target groups of selection having the third priority of FIG. 5, all of the RAID apparatuses connected with the virtual switches of the controllers are targets. For example, in the case of the system configuration of FIG. 4, the RAID apparatuses 12-11 and 12-12 connected with the controllers 10-11 and 10-12 are selected as one (1) physical disk group. Next, a selecting process for assigning the physical disk apparatuses having the designated capacity to the virtual disks after the physical disk groups that are the target groups have been selected according to FIG. 5, will be descried. In the selection of the physical disk apparatuses constituting the virtual disks of the present invention, as shown in the procedure of the physical disk selection of FIG. 6, the selection B1 that minimizes the number of the physical disks is first executed and, if the selection is unsuccessful using the selection B1, the selection B2 that minimizes the number of the extents is executed. The selection that minimizes the number of the physical disks improves the reliability and the serviceability of the virtual storage because the physical disk apparatuses are assigned such that points that are factors for generating faults are minimized. In the embodiment of the present invention, selection is executed such that the number of physical disks constituting the virtual disks are minimized. However, because this selection minimizes the points that are factors for generating faults, the following conditions for selection can be applied as other selection criteria.

(1) To select such that the number of the paths is minimized; and
(2) To select such that the number of the RAID apparatuses is minimized.

On the other hand, the selection that minimizes the number of the extents means to minimize fragmentation ((being scattered into fragments) of areas to be assigned in one (1) physical disk apparatus and, thereby, access performance to the virtual modules in the virtual storage environment can be improved.

FIGS. 7A to 7C show the selection conditions used in a physical disk selecting process of the present invention. FIG. 7A is a list according to the priority of the selection conditions of the physical disk apparatuses and the first priority to the third priority are the selection that minimizes the number of the physical disks shown in B1 of FIG. 6, that is, the selecting process executed by the first selecting unit 32 of FIGS. 2A and 2B. In contrast, the fourth priority and the fifth priority are selection conditions for realizing the selection B2 of FIG. 6 that minimizes the number of extents and is the selecting process executed by the second selecting unit 34 of FIGS. 2A and 2B. The selection condition for minimizing the number of the physical disks of FIG. 7A is as follows. First, as the first priority, a physical disk "having an available extent capacity that is equal to or larger than the designated capacity" is selected. If a plurality of physical disks selected based on this condition are present, as shown on the right of the cell, "a physical disk having extents of the minimal capacity is selected". As the capacity selection condition of the second selection priority, a physical disk "having an available physical disk capacity that is equal to or larger than the designated capacity" is select. If a plurality of physical disks selected based on this condition are present, as shown on the right of the cell, "a physical disk having the minimal capacity is selected". As the third selection priority, a physical disk "having an available physical disk capacity that is smaller than the designated capacity" is select. If a plurality of physical disks selected based on this condition are present, as shown on the right of the cell, "a physical disk having the maximal capacity is selected". Next, selection of physical disks of the fourth and the fifth selection priority that minimizes the number of the extents will be described. As the capacity selection condition of the fourth selection priority, a physical disk "having an available extent capacity that is smaller than the designated capacity" is select. If a plurality of extents selected based on this condition are present, "an extent having the maximal capacity is selected". As to the fifth selection priority, as the capacity selection condition, an extent "having an available extent capacity that is equal to or larger than the designated capacity" is select. If a plurality of extents satisfying this selecting condition are present, as shown on the right of the cell, "an extent having the minimal capacity is selected".

FIG. 7B shows the conditions for selection priority in the case where a plurality of extents of the physical disk apparatuses are selected for each of the first to the fifth selection priority conditions based on the selection conditions of FIG. 7A. In FIG. 7B, a same condition is set for the first, the fourth and the fifth priority of FIG. 7A of the selection priority and another same selection condition is set for the second and the third selection priority. As to the first, the fourth and the fifth selection priority, the selection priority for the case where extents of a plurality of physical disks are selected is as follows.

(1) The order of RAID levels;
(2) The order of IDs of the physical disks; and
(3) The order of logic block addresses LBA of the physical disks.

Among these, the order of RAID levels is, as shown in the cell on the right, the order of RAID level (0+1), level 1, level 5 and level 0. Here, the RAID level (0+1) is, as shown in FIG. 7C, obtained by mirroring the RAID level 0 to be the RAID level 1. The order of IDs of the physical disks is employed in the case where a plurality of disks are present on the RAID level. Furthermore, the order of LBAs of the physical disks is employed in the case where a plurality of extents are present in the physical disks. As the second and the third selection priority of FIG. 7B, the following is set as the selection priority in the case where a plurality of extents of the physical disks are selected.

(1) The order of ascending number of extents;
(2) The order of RAID levels; and
(3) The order of IDs of physical disks.

When constituent extents of the physical disk apparatuses constituting the virtual disks satisfying the designated capacity have been determined based on the selection conditions shown in these FIGS. 7A and 7B, a sorting process is executed that rearranges the constituent extents in order of the IDs internally retained in the physical disk apparatuses and the order of the LBA in the physical disk apparatuses and the selecting process is ended.

Figure 8B:
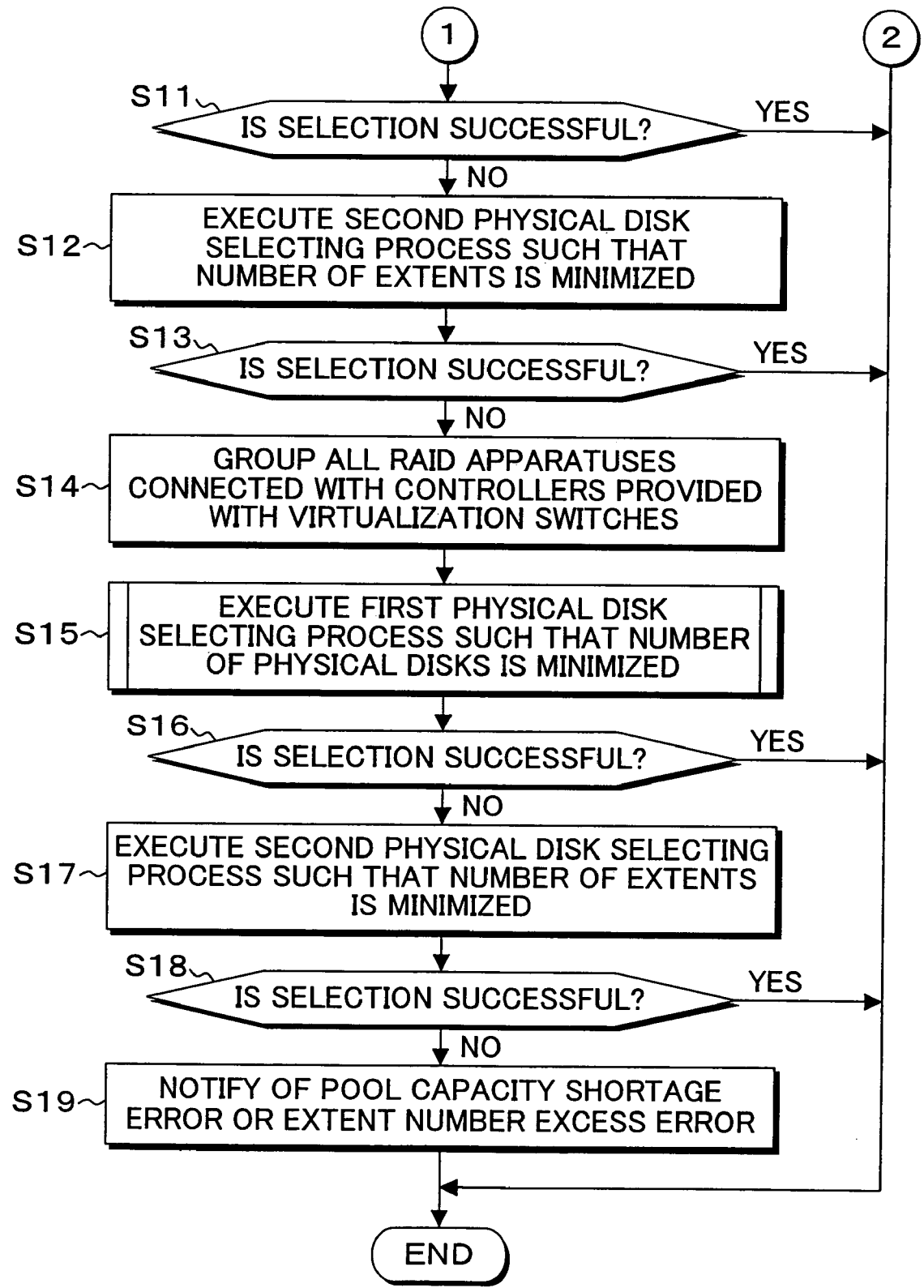
FIG. 8B is a flowchart continued from FIG. 8A.

FIG. 8A and FIG. 8B are flowcharts of the virtual storage management process according to the present invention and the procedure of this flowchart is the content of a virtual storage managing program provided by the present invention. In the virtual storage management process of FIG. 8A, a designated capacity of virtual disks that a user desires corresponding to an application on the side of the server is captured at step S1, after grouping the physical disks into the physical disk groups for each path connected with the controllers provided with the virtual switches at step S2, the physical disk groups are selected in order of descending rate of virtually unassigned capacity at step S3 and the first physical disk selecting process is executed such that the number of the physical disk groups is minimized for the selected physical disk groups in step S4. If the selecting process is successful at step 4, a sorting process is executed that rearranges the selected extents constituting the virtual disks using the IDs of the physical disk apparatuses and the LBAs in the physical disk apparatuses as keys and the process is ended. If the selection is unsuccessful at step S5, the process is advanced to step S6 at which the second disk selecting process is executed such that the number of the extents is minimized. As to this selecting process, when success of the selection is determined at step S7, the sorting process of the extents constituting the virtual disk is executed and the series of processes are ended. If the selection is unsuccessful at step S7, the process is advanced to step S8 at which the physical disks are classified into physical disk groups for each RAID apparatus connected with the controllers provided with the virtual switches, the RAID apparatuses are selected in order of descending rate of virtually unassigned capacity at step S9 and the first disk selecting process is executed such that the number of the physical disk apparatuses is minimized at step S10. Then, when success of the selection has been determined at step S11 of FIG. 8B, the constituent extents are sorted and the process is ended. If the selection is unsuccessful, the process is advanced to step S12 at which the second disk selecting process is executed such that the number of the extents is minimized. If the selection is successful, the sorting process of the number of the constituent extents is executed at step S13 and the series of processes are ended. If the selection is unsuccessful at step S13, the process is advanced to step S14 at which all of the RAID apparatuses connected with the controllers provided with the virtual switches are selected, and the first disk selecting process is executed such that the number of the physical disk apparatuses is minimized at step S15. If the selection is successful, the constituent extents are sorted at step S16 and the process is ended. If the selection is unsuccessful, the process is advanced to step S17 at which the second disk selecting process is executed such that the number of the extents is minimized. If the selection is successful, the sorting process of the number of the constituent extents is executed at step S18 and the series of processes are ended. If the selection is unsuccessful, the process is advanced to step S19 at which a pool capacity shortage error or an extent number excess error is notified and the process is ended. When the process is ended by this notification of the error, the selecting process may be executed by again executing the designation of the capacity of the virtual disks with, for example, a reduced designated capacity. As will be clear in the following description, in the present invention, for the extent number excess error at step S19, the number of extents selected from one (1) physical disk apparatus is limited to, for example, less than 16 and, if this limit value of the number of the extents equals or is exceeded, the selection is regarded as unsuccessful and, when the cause of the unsuccessful selection is the excessive number of the extents, an error notification indicating this is executed.

Figure 9A:
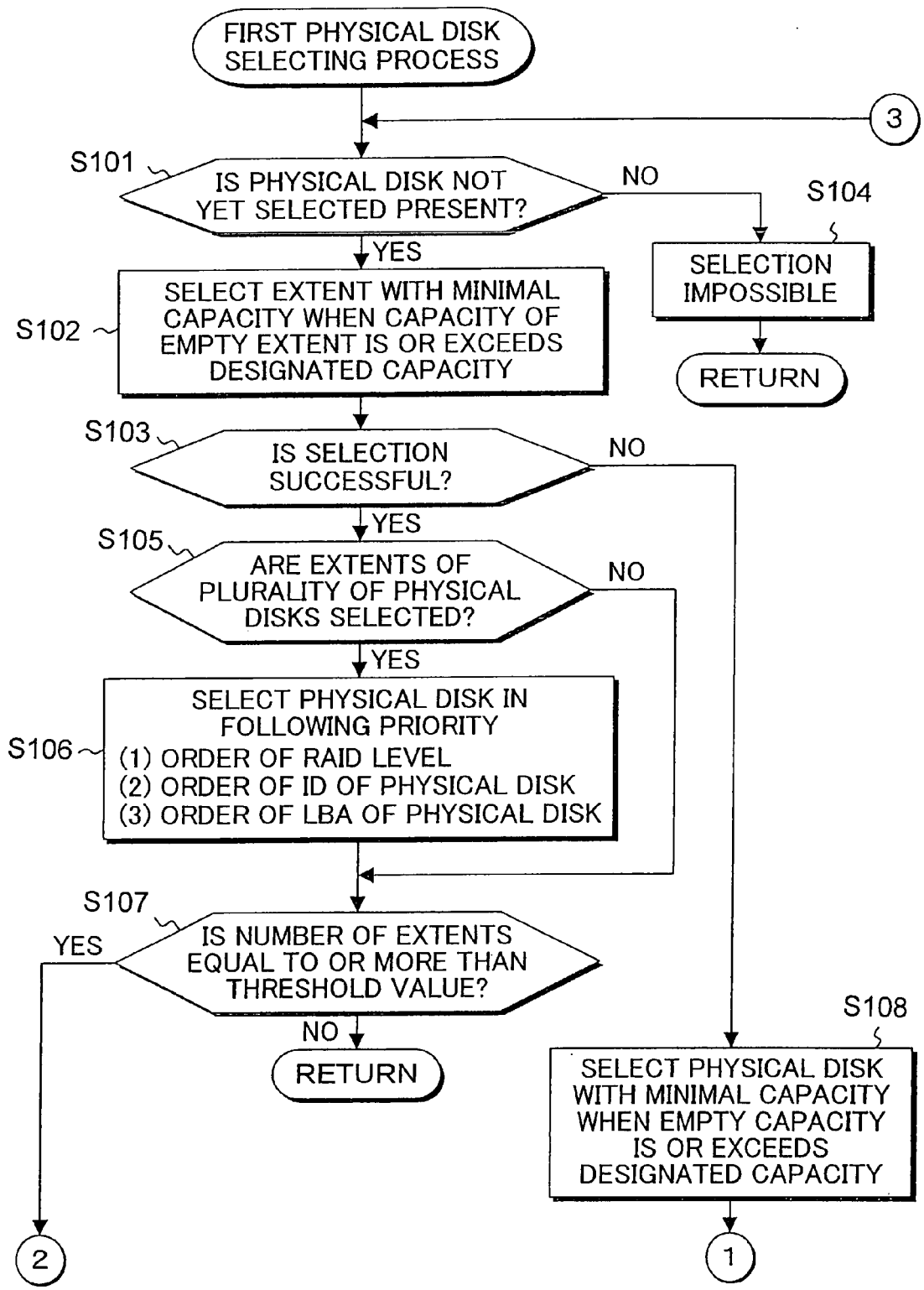
FIGS. 9A and 9B are flowcharts of a first physical disk selecting process executed at steps S4, S10 and S15 of FIG. 8A and FIG. 8B.
Figure 9B:
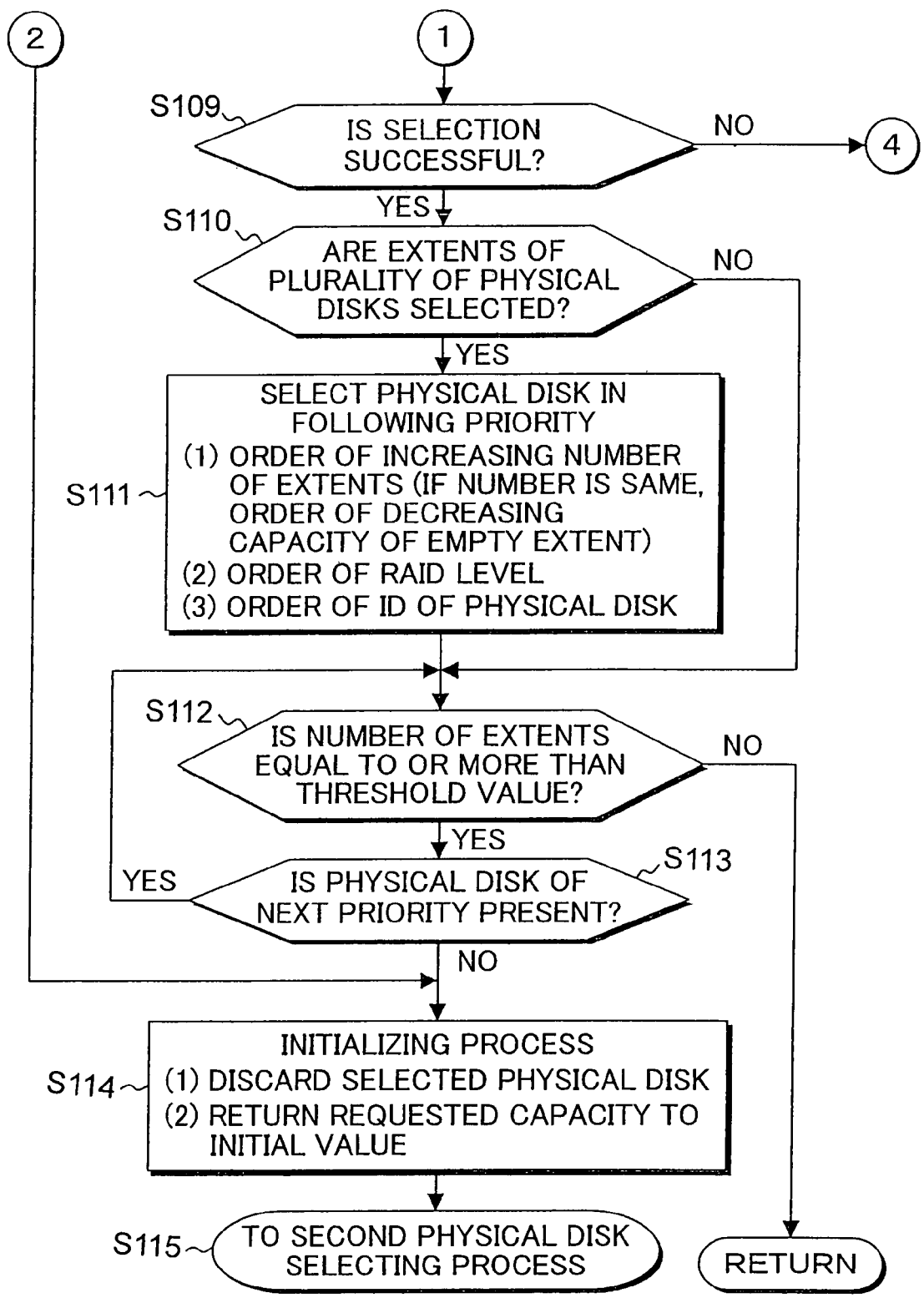

FIGS. 9A and 9B and FIG. 9C together show a flowchart of the first physical disk selecting process executed at steps S4, S10 and S15 of FIG. 8A and FIG. 8B and this process is the process function of the first selecting unit 32. In FIGS. 9A and 9B, in the first physical disk selecting process, a selecting process based on the selection condition of the first selection priority of FIG. 7A is executed at steps S101 to S107. First, whether or not physical disks not selected yet are present is checked at step S101 and, if any physical disk not yet selected is present, the process is advanced to step S102 at which an extent having an available extent capacity that is equal to or larger than the designated capacity and is the smallest capacity is selected. When the selection is successful at step S103, the process is advanced to step S105 at which whether or not extents of a plurality of physical disks have been selected is checked. If extents of a plurality of physical disks have been selected, the process is advanced to step S106 at which physical disks are selected according to the priority shown in the cells for the first, the fourth and the fifth selection priority of FIG. 7B. If extents of a single physical disk have been selected at step S105, the process at step S106 is omitted. Then, whether or not the number of the extents of the selected physical disk equals or exceeds a predetermined threshold that is, for example, 16 is checked at step S107 and, if the number does not equal or exceed 16, the process is returned to the main routine of FIG. 8A and FIG. 8B regarding that a normal selecting process has been executed. If no physical disk not yet assigned is present at step S101,the process is returned to the main routine regarding that the selection is impossible, at step S104. On the other hand, if the number of extents of the physical disks selected at step S107 equals or exceeds the threshold that is, for example, 16, the process is advanced to step S114 regarding that the selection is unsuccessful. Steps S108 to S113 of FIGS. 9A and 9B are physical disk selecting processes according to the selection conditions of the second selection priority of Fig. 7A. A physical disk having an available capacity that is equal to or larger than the designated capacity and is the smallest capacity is selected at step S108. If the selection of the physical disk is successful at step S109, the process is advanced to step S110 at which whether or not extents of a plurality of physical disks have been selected is checked. If extents of a plurality of physical disks have been selected, the process is advanced to step S111 at which selection of extents of one (1) physical disk is determined in order of the priority shown in cells for the second and the third selection priority of FIG. 7B. Physical disks are selected in (1) "the order of ascending number of extents" of step S111 and, in this case, if two (2) physical disks have been selected, a physical disk having an equal or larger available extent capacity is selected. If extents of a single physical disk is selected at step S110, the process at step S111 is omitted. Next, whether or not the number of the extents equals or exceeds a threshold is checked at step S112 and, if the number equals or exceeds the threshold, the process is advanced to step S113 at which whether or not the number of the extents at step S112 at which the physical disk has been selected according to the next priority among the priority shown at step S111 equals or exceeds the threshold is checked. Then, the selection of the physical disk of the next priority at step S113 is repeated until the number of extents becomes fewer than the threshold and, when the number of the extents has become fewer than the threshold, the process is returned to the main routine of FIG. 8A and FIG. 8B regarding that this selection is successful. If the number of the extents equals or exceeds the threshold, the process is advanced to step S114 and the selection is unsuccessful though selection of the physical disks has been executed according to all the priority of step S111 at step S113. If the selection is unsuccessful at step S109, a selecting process of physical disks is executed according to the selection condition for the third selection priority of FIG. 7A at steps S116 to S120 of FIG. 9C. That is, a physical disk having an available capacity that is smaller than the designated capacity and is the maximal capacity is selected at step S116 and, if the selection is successful, the process is returned to the main routine of FIG. 8A and FIG. 8B at step S117. If the selection is unsuccessful, the process is advanced to step S118 at which whether or not extents of a plurality of physical disks have been selected is checked and, if selected, physical disks are selected according to the selection priority for the case where extents of a plurality of physical disks shown as the first, the fourth and the fifth selection priority of FIG. 7B at step S19. If extents of a single disk have been selected at step S118 step S119 is omitted. Updating of the designated capacity is executed at the next step S120. That is, a new designated capacity is calculated by subtracting the capacity of the selected physical disk from the current designated capacity and the process is returned to step S101 of FIGS. 9A and 9B. Then, the same process from step S102 is repeated for the remaining designated capacity. On the other hand, if the number of extents of the physical disks selected in the process of step S107 or steps S112 and S113 equals or exceeds the threshold, the selecting process that minimizes the number of physical disks is unsuccessful and, therefore, after executing a initialization process such as:

(1) discarding the selected physical disks; and (2) returning the desired capacity to the initial value, at step S114 the process is advanced to step S115 to move into the second physical disk selecting process shown in FIG. 9C.

As shown in the main routine of FIG. 8A and FIG. 8B, in the case where the target group of selection is all ID apparatuses connected with the controllers provided with the virtual switches at step S114 only the first physical disk selecting process is executed as step S115. Therefore, in this case, the process is not moved into the second physical disk selecting process of FIGS. 10A and 10B.

Figure 10A:
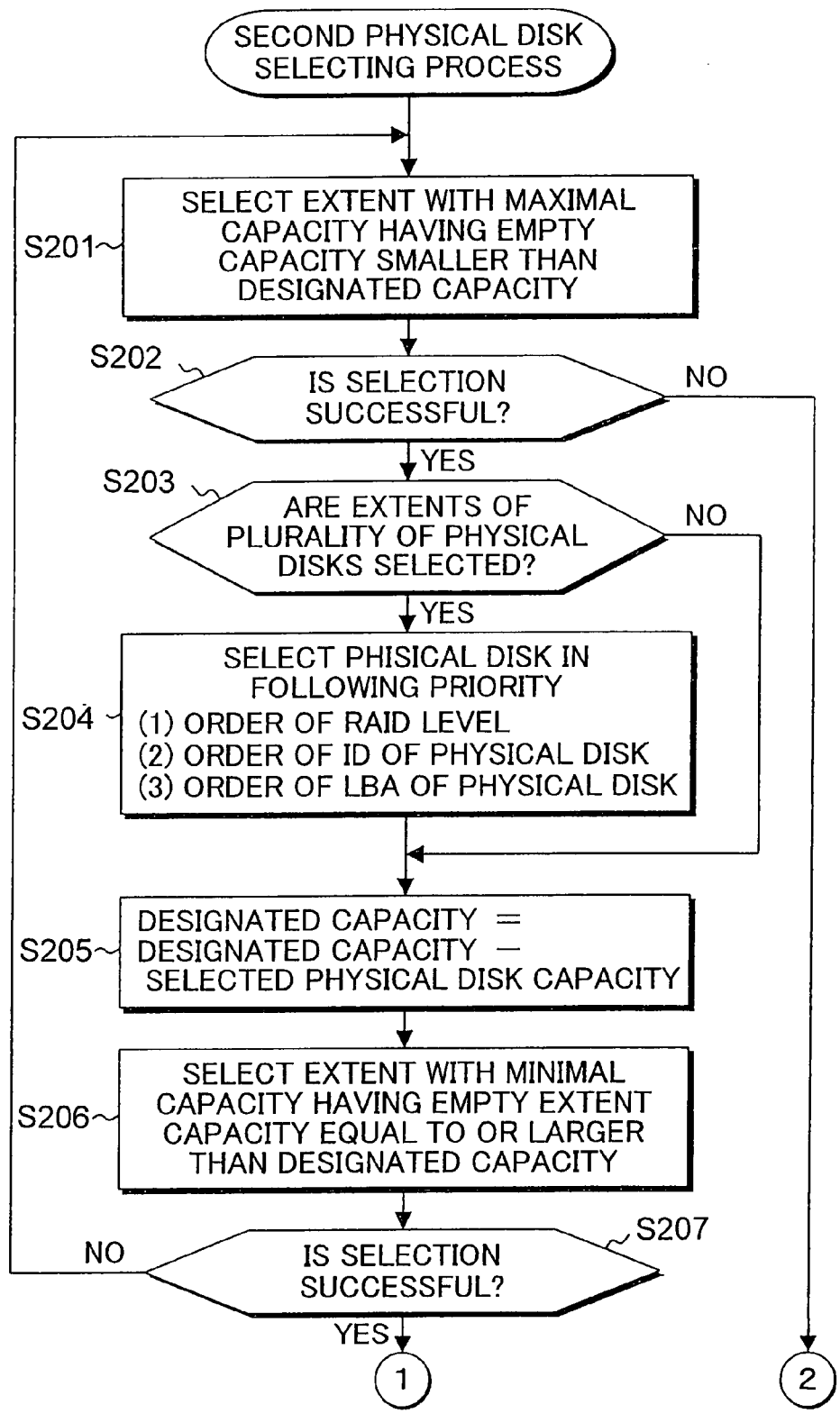
FIGS. 10A and 10B are flowcharts of a second physical disk selecting process executed at steps S6 and S12 of FIG. 8A and FIG. 8B.
Figure 10B:
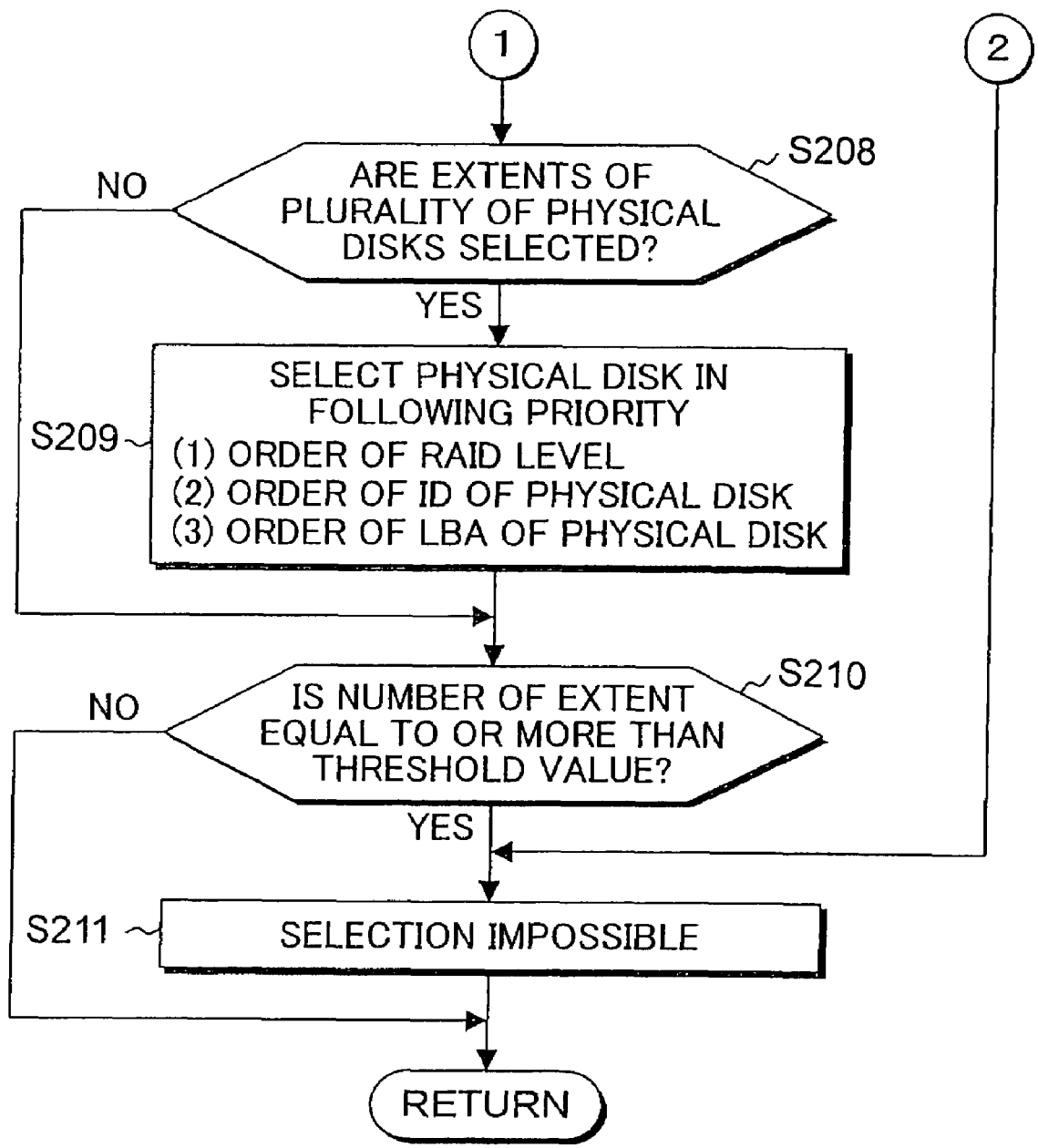

FIGS. 10A and 10B are flowcharts of the second physical disk selecting process executed at steps S6, S12 and S17 of FIG. 8A and FIG. 8B, and this process corresponds to the processing function of the second selecting unit 34 of FIGS. 2A and 2B. In FIGS. 10A and 10B, in the second physical disk selecting process, a selection process according to the selection condition for the fourth selection priority of FIG. 7A is executed at steps S201 to S205. First, an extent having an available extent capacity that is smaller than the designated capacity and is the maximal capacity is selected at step S201. If the selection is successful, the process is advanced to step S202 at step S203 at which whether or not extents of a plurality of physical disks are selected is checked and, if selected, selection of physical disks is executed according to the priority for the case where extents of a plurality of physical disks are selected shown as the first, the fourth and the fifth selection condition priority of FIG. 7B at step S204. If a single extent has been selected, step S204 is omitted. Next, updating of the designated capacity is executed at step S205. That is, a new designated capacity is obtained by subtracting the capacity of the selected physical disk from the current designated capacity. If the selection is unsuccessful at step S202, the process is advanced to step S211 and the unsuccessful selection is determined. Then, the process is returned to the main routine of FIG. 8A and Fig. 8B. In the next steps S206 to S210 a selection process of physical disks according to the selection condition for the fifth selection priority of FIG. 7A is executed. First, extents having an available extent capacity that is equal to or larger than the designated capacity and is the minimal capacity are selected at step S206. If the selection is unsuccessful, the process is returned to step S201 at step S207 at which the selection process of extents having an available extent capacity that is smaller than the designated capacity and is the maximal capacity is repeated. If the selection is successful at step S207, whether or not extents of p plurality of physical disks have been selected is checked at step S208 and if selected, physical disks are selected according to the selection priority shown in cells for the first, the fourth and the fifth selection priority of FIG. 7B at step S209. If extents of a single physical disk have been selected at step S208, step S209 is omitted. Then, whether or not the number of the extents of the physical disk selected at step S210 equals or exceeds the threshold is checked at step S210 and, if the number is smaller than the threshold, the process is returned to the main routine of FIG. 8A and FIG. 8B regarding that the selection is successful. If the number of the extents equals or exceeds the threshold, the selection is determined to be unsuccessful at step S211 and the process is returned to the main routine of FIG. 8A and FIG. 8B. Next, a detailed example of the physical disk selection constituting the virtual disks corresponding to the designated capacity according to the present invention will be described referring to FIGS. 11A and 11B and FIGS. 12A and 12B.

Figures 11A, 11B:
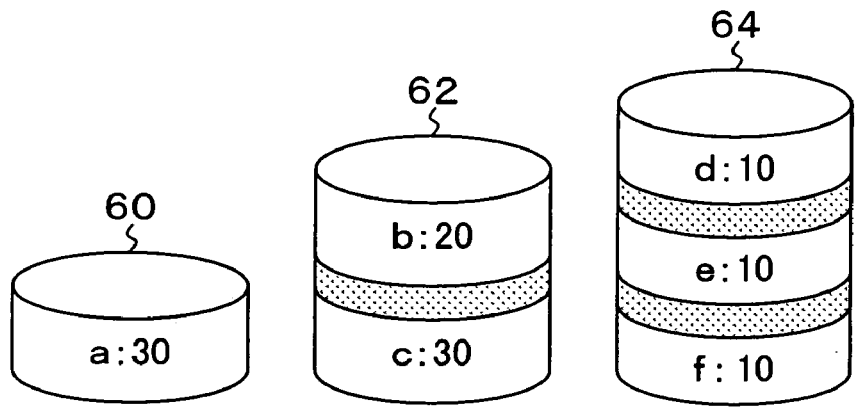
FIGS. 11A and 11B are explanatory views of a detailed example of the physical disk selection according to the present invention.

FIG. 11A shows the selection result and the sorting result in the case where the designated capacity is varied in a range of 1 to 110MB as shown in FIG. 11B targeting physical disks 60, 62 and 64. In FIG. 11A, the physical disk 60 is a physical disk that has not been assigned and an extent a is of 30 MB. In the following description, capacity is described only by number omitting "MB". The physical disk 62 is a disk that has been partially assigned. An extent b is of 20 and an extent c is of 30. Here, selection of extents in the case where the designated capacity is varied to 10, 20, 30, 40, 50, 60, 70, 80, 90, 100 and 110 in FIG. 11B targeting the physical disk groups of FIG. 11A will be described as follows. Written in parentheses are applicable selection conditions of FIGS. 7A to 7C and, for FIG. 7A, the conditions are denoted by "A-1 to A-5" and, for FIG. 7B, the conditions are denoted by "B-1-1 to B-5-3". The following procedure is taken for the case where the designated capacity=10.
(1) Extents b, c, d, e and f each having an available capacity equal to or larger than the designated capacity of 10 are selected (A-1).
(2) The extents d, e and f having the minimal capacity of 10 are selected (A-1).
(3) The extent d is selected based on the order of LBA (B-1-3).

The following procedure is taken for the case where the designated capacity=20.
(1) The extents b and c each having an available capacity equal to or larger than the designated capacity of 20 are selected (A-1).
(2) The extents b having the minimal capacity of 20 is selected (A-4).

The following procedure is taken for the case where the designated capacity=30.
(1) The extents a of the physical disk 60, having an available capacity equal to or larger than the designated capacity of 30 is selected (A-2).

The following procedure is taken for the case where the designated capacity=40.
(1) No extent having an available capacity equal to or larger than the designated capacity of 40 is present.
(2) the physical disk 62 having a capacity equal to or larger than the designated capacity of 40 is selected (A-2).
(3) The largest extents c in the physical disk 62 is selected (A-4).
(4) The designated capacity after selection=40−30=10.
(5) The extent b having an available capacity that is equal to or larger than the designated capacity of 10 and is the minimal capacity in the physical disk 62 is selected (A-5).
(6) The selected extents c and b are sorted to be "b and c".

The procedure for the case where the designated capacity=50 is same as that for the case where the designated capacity=40.

The following procedure is taken for the case where the designated capacity=60.
(1) No extent having an available capacity equal to or larger than the designated capacity of 60 is present.
(2) No physical disk having an available capacity equal to or larger than the designated capacity of 60 is present.
(3) The physical disk 62 having an available capacity that is smaller than the maximal capacity of 60 and is the maximal capacity is selected (selection of the extents c and b) (A-3).
(4) The designated capacity after the selection=60−50=10.
(5) The extents d, e and f each having an available capacity that is equal to or larger than the designated capacity of 10 and is the minimum capacity are selected (A-1).
(6) The extent d is selected based on the order of the LBA.
(7) the selected extents c, b and d are sorted to be "b, c and d".

The following procedure is taken for the case where the designated capacity=70.
(1) No extent having an available capacity equal to or larger than the designated capacity of 70 is present.
(2) No physical disk having an available capacity equal to or larger than the designated capacity of 70 is present.
(3) The physical disk 62 having an available capacity that is smaller than the maximal capacity of 70 and is the maximal capacity is selected (selection of the extents c and b) (A-2).
(4) The designated capacity after the selection=70−50=20.
(5) The extent a having an available capacity that is equal to or larger than the designated capacity of 20 and is the minimum capacity is selected (A-1).
(6) The extent d is selected based on the order of the LBA.
(7) the selected extents c, b and a are sorted to be "a, b and c".

The procedure for the case where the designated capacity=80 is same as that for the case where the designated capacity=70. In the procedure for the case where the designated capacity=90, the extent d is added to the extents a, b and c in the procedure for the case where the designated capacity=80. In the procedure for the case where the designated capacity=100, the extent e is added to the extents a, b, c and d in the procedure for the case where the designated capacity=90. In the procedure for the case where the designated capacity=110, the extent f is added to the extents a, b, c, d and e in the procedure for the case where the designated capacity=100.

Figures 12A, 12B:
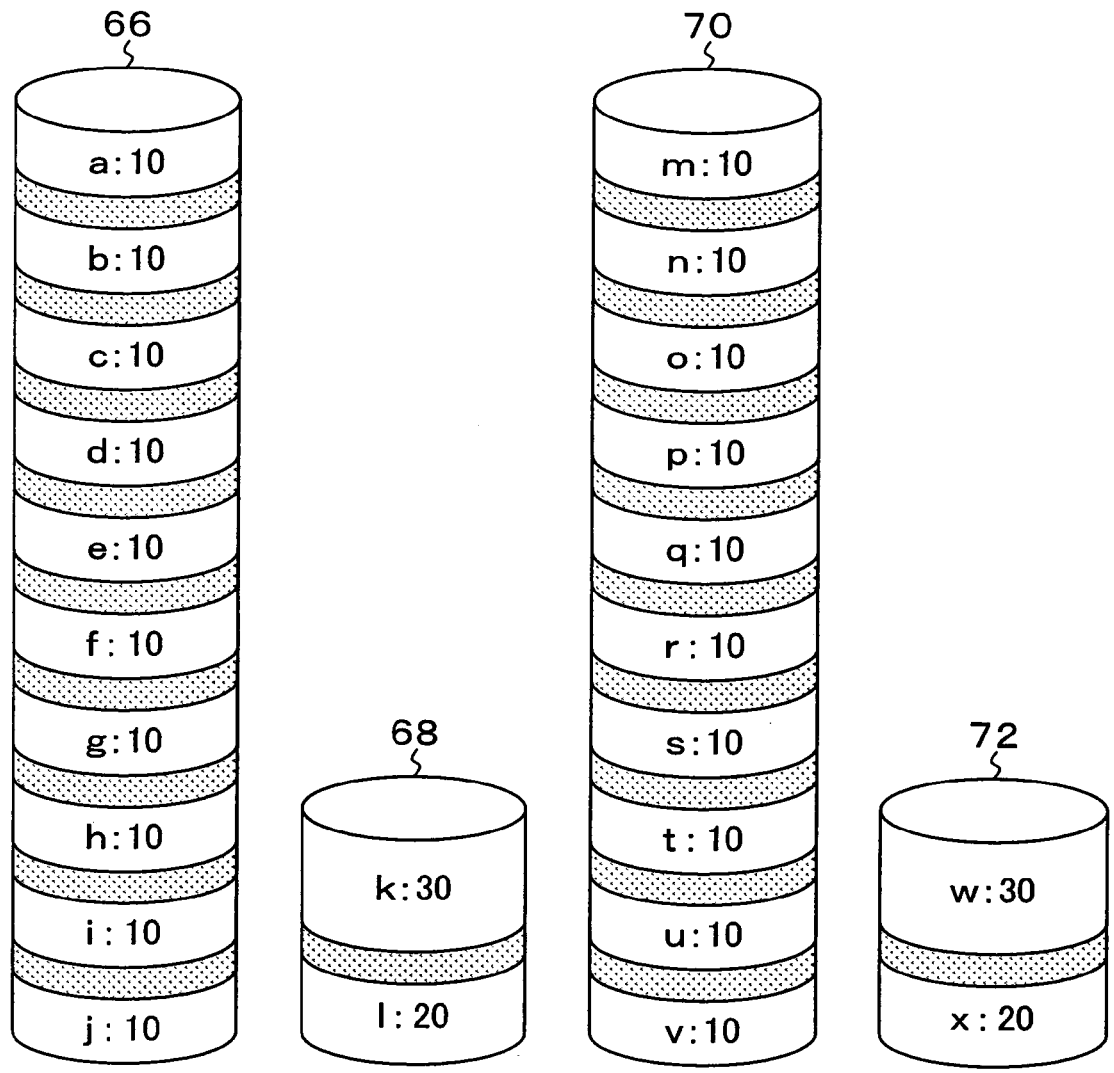
FIGS. 12A and 12B are explanatory views of another detailed example of the physical disk selection according to the present invention.

FIGS. 12A and 12B show a detailed example of the case where the selection of the extents is re-executed from the first because the number of the selected extents has exceeded the threshold that is the limit value. In FIG. 12A, a physical disk 66 has ten (10) extents "a" to j as unassigned areas and each of the extents has a capacity of 10. A physical disk 68 has extents k and l as unassigned areas. A physical disk 70 has ten (10) extents ma to v as unassigned areas. Each of the extents has a capacity of 10. In addition, a physical disk 72 has extents w and x as unassigned areas. Here, assuming that the designated capacity is 200 as shown in FIG. 12B, selection is executed according to the following procedure.
(1) The extents a to j of the physical disk 66 having the largest available capacity of 100 against the designated capacity of 200 are selected and, in this case, the remaining designated capacity is 100.
(2) The extents ma to v of the physical disk 70 having an available capacity of 100 that equals to the designated capacity of 100 are selected.
(3) Because the number of the extents is 20 and exceeds the limit value of 16, this selection of extents is re-executed from the first.

(4) The largest extent k against the designated capacity of 200 is selected. The remaining designated capacity is 170.
(5) The largest extent w against the designated capacity of 170 is selected. The remaining designated capacity is 140.
(6) After this, similarly, selection of the largest extent against the designated capacity is repeated and the extents l, x and a to j are selected.
(7) Because the number of the extents is 14 and is fewer than the limit value, the selection is determined to be successful.
(8) The selected extents are sorted based on the ID of the physical disk as a first key and the logic block address as a second key.

The present invention provides a virtual storage management program and this virtual storage management program is executed by a computer constituting the management server 15 provided to the controllers 10-1 and 10-2 as shown in FIGS. 2A and 2B. This computer is provided with a CPU, an RM, a hard disk drive, etc. The hard disk drive has loaded the virtual storage management program of the present invention and necessary programs are read from the hard disk drive when the computer is started up, are displayed on an ROM and are executed by the CPU. Though the above embodiment takes an example of a RAID apparatus using magnetic disk apparatuses as physical volumes, the physical volumes include appropriate storage apparatuses such as optical disk apparatuses, magnetic tape apparatuses, etc. in addition to magnetic disk apparatuses. Furthermore, the present invention encompasses any appropriate variations without impairing the object and advantages thereof and is not intended to be limited by the values indicated in the above embodiment.

What is claimed is:

1. A computer readable medium storing a virtual storage management program, said virtual storage management program causing a computer to execute:
    a capacity designation designating the capacity of virtual volumes;
    a first selection selecting one (1) or a plurality of physical volumes which satisfy the designated capacity from a pool which registers the physical volumes such that the number of selected physical volumes is minimized and assigning the selected physical volumes to the virtual volumes;
    a second selection selecting one (1) or a plurality of physical volumes which satisfy the designated capacity such that the number of extents is minimized which is the number of unassigned areas dispersed in the selected physical volumes and assigning the selected physical volumes to the virtual volumes if the selection is unsuccessful at the first selection,
    wherein the first selection comprises:
    a first priority selection selecting an extent having an available capacity which is equal to or larger than the designated capacity and which is the minimal capacity;
    a second priority selection selecting a physical volume having an available capacity which is equal to or larger than the designated capacity and which is the minimal capacity if the selection is unsuccessful at the first priority selection; and
    a third priority selection selecting a physical volume having an available capacity which is smaller than the designated capacity and which is the maximal capacity if the selection is unsuccessful at the second priority selection.

2. A computer readable medium storing a virtual storage management program according to claim 1, wherein
    the first priority selection includes, when the extents of a plurality of physical volumes are selected,
    first, selecting the plurality of physical volumes in order of RAID levels of level (0+1), level 1, level 5 and level 0;
    second, selecting the plurality of physical volumes in order of IDs of the physical volumes if the physical volumes can not be selected based on the RAID levels thereof; and
    third, selecting the plurality of physical volumes in order of logic block addresses LBAs of the physical volumes if the physical volumes can not be selected based on the IDs thereof, and wherein
    the second or the third priority selection includes, when the extents of a plurality of physical volume are selected,
    first, selecting the plurality of physical volumes in order of ascending number of extents;
    second, selecting the plurality of physical volumes in order of the RAID levels of level (0+1), level 0, level 5 and level 0 if the physical volumes can not be selected based on the number of extents;
    third, selecting the plurality of physical volumes in order of IDs of the physical volumes if the physical volumes can not be selected based on the RAID levels thereof; and
    fourth, selecting the plurality of physical volumes in order of logic block address LBA of the physical volumes if the physical volumes can not be selected based on the IDs thereof.

3. A computer readable medium storing a virtual storage management program according to claim 1, wherein the second selecting comprises:
    a fourth priority selection selecting an extent having an available capacity which is smaller than the designated capacity and which is the maximal capacity; and
    a fifth priority selection selecting an extent having an available extent capacity which is equal to or larger than the designated capacity and which is the minimal capacity if the selection is unsuccessful at the fourth priority selection.

4. A computer readable medium storing a virtual storage management program according to claim 3, wherein, the fourth and the fifth priority selection include, when extents of a plurality of physical volumes are selected,
    first, selecting the plurality of physical volumes in order of the RAID levels of level (0+1), level 1, level 5 and level 0;
    second, selecting the plurality of physical volumes in order of IDs of the physical volumes if the physical volumes can not be selected based on the RAID levels thereof; and
    third, selecting the plurality of physical volumes in order of the logic block addresses LBAs of the physical volumes if the physical volumes can not be selected based on the IDs thereof.

5. A computer readable medium storing a virtual storage management program according to claim 1, further operable to drive the computer to execute a target group selection of dividing the physical volume groups into groups prior to the first and the second selection and selecting each group one after another for execution of the first and the second selection.

6. A computer readable medium storing a virtual storage management program according to claim 5, wherein the target group selection comprises:
    a first target group selection dividing a plurality of physical disk groups into groups respectively for each connection path connecting to controllers provided with virtual switch features, and selecting each group one after another for execution of the first and the second selection;

a second target group selection of dividing a plurality of physical volume groups into groups for each RAID apparatus connected with the plurality of controllers, and selecting each group one after another for execution of the first and the second selection when the selection is unsuccessful at the first target group selection; and a third target group selection selecting the physical volume groups regarding all the RAID apparatuses connected with the controllers as one (1) group for execution of the first and the second selection when the selection is unsuccessful at the second target group selection 7. A computer readable medium storing a virtual storage management program according to claim 6, wherein the first target group selection includes classifying connection paths with the plurality of physical volume groups into first connection paths that are not aware of the controllers of the physical volume groups and primary-connected second connection paths primary-connected with awareness of the controllers, and dividing physical volume groups into physical volume groups for each of the first connection paths and physical volume groups for each of the second connection paths for selection one after another.

8. A computer readable medium storing a virtual storage management program according to claim 6, wherein the first target group selection includes selecting each group in order of physical volume group having a descending rate of virtually unassigned capacity which is the rate of the total capacity not assigned against the total capacity such that the connection paths pertaining to the physical volumes constituting the virtual volumes are balanced among the physical volumes.

9. A computer readable medium storing a virtual storage management program according to claim 6, wherein the second target group selection includes selecting each group in order of RAID apparatus having a descending rate of virtually unassigned capacity which is the rate of the total capacity not assigned against the total capacity such that the RAID apparatuses pertaining to the physical volumes constituting the virtual volumes are balanced among the physical volumes.

10. A virtual storage management method comprising:

a capacity designation of designating the capacity of virtual volumes provided in a virtual storage pool;

a first selection selecting one (1) or a plurality of physical volumes which satisfy the designated capacity from the pool which registers the physical volumes such that the number of selected physical volumes is minimized and assigning the selected physical volumes to the virtual volumes;

a second selection selecting one (1) or a plurality of physical volumes which satisfy the designated capacity such that the number of extents is minimized which is the number of unassigned areas dispersed in the selected physical volumes and assigning the selected physical volumes to the virtual volumes if the selection is unsuccessful at the first selection, wherein the first selection comprises:

a first priority selection selecting an extent having an available capacity which is equal to or larger than the designated capacity and which is the minimal capacity;

a second priority selection selecting a physical volume having an available capacity which is equal to or larger than the designated capacity and which is the minimal capacity if the selection is unsuccessful at the first priority selection; and a third priority selection selecting a physical volume having an available capacity which is smaller than the designated capacity and which is the maximal capacity if the selection is unsuccessful at the second priority selection.

11. A virtual storage management method according to claim 10, wherein the first priority selection includes, when the extents of a plurality of physical volumes are selected, first, selecting the plurality of physical volumes in order of RAID levels of level (0+1), level 1, level 5 and level 0;

second, selecting the plurality of physical volumes in order of IDs of the physical volumes if the physical volumes can not be selected based on the RAID levels thereof; and third, selecting the plurality of physical volumes in order of logic block addresses LBAs of the physical volumes if the physical volumes can not be selected based on the IDs thereof, and wherein the second or the third priority selection includes, when the extents of a plurality of physical volume are selected, first, selecting the plurality of physical volumes in order of ascending number of extents;

second, selecting the plurality of physical volumes in order of the RAID levels of level (0+1), level 1, level 5 and level 0 if the physical volumes can not be selected based on the number of extents;

third, selecting the plurality of physical volumes in order of IDs of the physical volumes if the physical volumes can not be selected based on the RAID levels thereof; and fourth, selecting the plurality of physical volumes in order of logic block address LBA of the physical volumes if the physical volumes can not be selected based on the IDs thereof.

12. A virtual storage management method according to claim 10, wherein the second selecting comprises:

a fourth priority selection selecting an extent having an available capacity which is smaller than the designated capacity and which is the maximal capacity; and a fifth priority selection selecting an extent having an available extent capacity which is equal to or larger than the designated capacity and which is the minimal capacity if the selection is unsuccessful at the fourth priority selection.

13. A virtual storage management method according to claim 12, wherein, the fourth and the fifth priority selection include, when extents of a plurality of physical volumes are selected, first, selecting the plurality of physical volumes in order of the RAID levels of level (0+1), level 1, level 5 and level 0;

second, selecting the plurality of physical volumes in order of IDs of the physical volumes if the physical volumes can not be selected based on the RAID levels thereof; and third, selecting the plurality of physical volumes in order of the logic block addresses LBAs of the physical volumes if the physical volumes can not be selected based on the IDs thereof.

14. A virtual storage management method according to claim 10, further operable to drive the computer to execute a target group selection dividing the physical volume groups into groups prior to the first and the second selection and selecting each group one after another for execution of the first and the second selection.

15. A virtual storage management method according to claim 14, wherein the target group selection comprises:

a first target group selection dividing a plurality of physical disk groups into groups respectively for each connection path connecting to controllers provided with virtual switch features, and selecting each group one after another for execution of the first and the second selection;

a second target group selection dividing a plurality of physical volume groups into groups for each RAID apparatus connected with the plurality of controllers, and selecting each group one after another for execution of the first and the second selection when the selection is unsuccessful at the first target group selection; and a third target group selection selecting the physical volume groups regarding all the RAID apparatuses connected with the controllers as one (1) group for execution of the first and the second selection when the selection is unsuccessful at the second target group selection.

16. A virtual storage management method according to claim 15, wherein the first target group selection includes classifying connection paths with the plurality of physical volume groups into first connection paths that are not aware of the controllers of the physical volume groups and primary-connected second connection paths primary-connected with awareness of the controllers, and dividing physical volume groups into physical volume groups for each of the first connection paths and physical volume groups for each of the second connection paths for selection one after another.

17. A virtual storage management method according to claim 15, wherein the first target group selection includes selecting each group in order of physical volume group having a descending rate of virtually unassigned capacity which is the rate of the total capacity not assigned against the total capacity such that the connection paths pertaining to the physical volumes constituting the virtual volumes are balanced among the physical volumes.

18. A virtual storage management method according to claim 15, wherein the second target group selection includes selecting each group in order of RAID apparatus having a descending rate of virtually unassigned capacity which is the rate of the total capacity not assigned against the total capacity such that the RAID apparatuses pertaining to the physical volumes constituting the virtual volumes are balanced among the physical volumes.

19. A virtual storage system comprising:

a controller capable of providing a virtual storage management to a host server;

an actual disk apparatus connected to said controller; and a virtual storage management apparatus capable of managing the virtual storage environment of said controller;

the virtual storage management apparatus comprises:

a capacity designation unit configured to designate the capacity of virtual volumes provided in a virtual storage pool;

a first selection unit configured to select one (1) or a plurality of physical volumes which satisfy the designated capacity from the pool which registers the physical volumes such that the number of selected physical volumes is minimized, and assign the selected physical volumes to the virtual volumes;

a second selection unit configured, if the selection is unsuccessful by the first selection unit, to select one (1) or a plurality of physical volumes which satisfy the designated capacity such that the number of extents is minimized which is the number of unassigned areas dispersed in the selected physical volumes, and assign the selected physical volumes to the virtual volumes, wherein the first selection unit comprises:

a first priority selection unit arranged to select an extent having an available capacity which is equal to or larger than the designated capacity and which is the minimal capacity;

a second priority selection unit arranged to select a physical volume having an available capacity which is equal to or larger than the designated capacity and which is the minimal capacity if the selection is unsuccessful by the first priority selection unit; and a third priority selection unit arranged to select a physical volume having an available capacity which is smaller than the designated capacity and which is the maximal capacity if the selection is unsuccessful by the second priority selection unit.

20. A virtual storage system according to claim 19, wherein the first priority selection unit is arranged, when the extents of a plurality of physical volumes are selected, first, to select the plurality of physical volumes in order of RAID levels of level (0+1), level 1, level 5 and level 0;

second, to select the plurality of physical volumes in order of IDs of the physical volumes if the physical volumes can not be selected based on the RAID levels thereof; and third, to select the plurality of physical volumes in order of logic block addresses LBAs of the physical volumes if the physical volumes can not be selected based on the IDs thereof, and wherein the second or the third priority selection unit is arranged, when the extents of a plurality of physical volume are selected, first, to select the plurality of physical volumes in order of ascending number of extents;

second, to select the plurality of physical volumes in order of the RAID levels of level (0+1), level 1, level 5 and level 0 if the physical volumes can not be selected based on the number of extents;

third, to select the plurality of physical volumes in order of IDs of the physical volumes if the physical volumes can not be selected based on the RAID levels thereof; and fourth, to select the plurality of physical volumes in order of logic block address LBA of the physical volumes if the physical volumes can not be selected based on the IDs thereof.

21. A virtual storage system according to claim 19, wherein the second selecting unit comprises:

a fourth priority selection unit arranged to select an extent having an available capacity which is smaller than the designated capacity and which is the maximal capacity; and a fifth priority selection unit arranged to select an extent having an available extent capacity which is equal to or larger than the designated capacity and which is the minimal capacity if the selection is unsuccessful by the fourth priority selection unit.

22. A virtual storage system according to claim 21, wherein, the fourth and the fifth priority selection units are arranged, when extents of a plurality of physical volumes are selected, first, to select the plurality of physical volumes in order of the RAID levels of level (0+1), level 1, level 5 and level 0;

second, to select the plurality of physical volumes in order of IDs of the physical volumes if the physical volumes can not be selected based on the RAID levels thereof; and third, to select the plurality of physical volumes in order of the logic block addresses LBAs of the physical volumes if the physical volumes can not be selected based on the IDs thereof.

23. A virtual storage system according to claim 19, further comprising a target group selection unit configured, prior to the processings of the first and the second selection units, to divide the physical volume groups into groups and select each group one after another for execution of the processings of the first and the second selection units.

24. A virtual storage system according to claim 23, wherein the target group selection unit comprises:
- a first target group selection unit arranged to divide a plurality of physical disk groups into groups respectively for each connection path connecting to controllers provided with virtual switch features, and select each group one after another for execution of the processings of the first and the second selection units;
- a second target group selection unit arranged, when the selection is unsuccessful by the first target group selection unit, to divide a plurality of physical volume groups into groups for each RAID apparatus connected with the plurality of controllers, and select each group one after another for execution of the processings of the first and the second selection units; and
- a third target group selection unit arranged, when the selection is unsuccessful at the second target group selection unit, to select the physical volume groups regarding all the RAID apparatuses connected with the controllers as one (1) group for execution of the processings of the first and the second selection units.

25. A virtual storage system according to claim 24, wherein the first target group selection unit is arranged to classify connection paths with the plurality of physical volume groups into first connection paths that are not aware of the controllers of the physical volume groups and primary-connected second connection paths primary-connected with awareness of the controllers, and divide physical volume groups into physical volume groups for each of the first connection paths and physical volume groups for each of the second connection paths for selection one after another.

26. A virtual storage system according to claim 24, wherein the first target group selection unit is arranged to select each group in order of physical volume group having a descending rate of virtually unassigned capacity which is the rate of the total capacity not assigned against the total capacity such that the connection paths pertaining to the physical volumes constituting the virtual volumes are balanced among the physical volumes.

27. A virtual storage system according to claim 24, wherein the second target group selection unit is arranged to select each group in order of RAID apparatus having a descending rate of virtually unassigned capacity which is the rate of the total capacity not assigned against the total capacity such that the RAID apparatuses pertaining to the physical volumes constituting the virtual volumes are balanced among the physical volumes.

* * * * *

UNITED STATES PATENT AND TRADEMARK OFFICE
CERTIFICATE OF CORRECTION

PATENT NO. : 7,447,838 B2  
APPLICATION NO. : 11/044229  
DATED : November 4, 2008  
INVENTOR(S) : Katsuo Aoyama Page 1 of 1

It is certified that error appears in the above-identified patent and that said Letters Patent is hereby corrected as shown below:

Column 18, Line 16, change "level 0," to --level 1,--.

Column 19, Line 11, after "selection" insert --.--.

Signed and Sealed this

Twenty-seventh Day of January, 2009

JOHN DOLL  
*Acting Director of the United States Patent and Trademark Office*